(12) United States Patent
Nishida et al.

(10) Patent No.: US 9,539,968 B2
(45) Date of Patent: Jan. 10, 2017

(54) VEHICLE FRONT SECTION STRUCTURE

(71) Applicant: TOYOTA JIDOSHA KABUSHIKI KAISHA, Toyota-shi (JP)

(72) Inventors: Gen Nishida, Aichi-gun (JP); Nobuaki Matsui, Miyoshi (JP); Reiji Iwaihara, Toyota (JP); Tatsuya Ayukawa, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/763,387

(22) PCT Filed: Jan. 8, 2014

(86) PCT No.: PCT/JP2014/050168
§ 371 (c)(1),
(2) Date: Jul. 24, 2015

(87) PCT Pub. No.: WO2014/115579
PCT Pub. Date: Jul. 31, 2014

(65) Prior Publication Data
US 2015/0360633 A1 Dec. 17, 2015

(30) Foreign Application Priority Data
Jan. 25, 2013 (JP) .................. 2013-012620

(51) Int. Cl.
*B60R 19/34* (2006.01)
*B62D 25/08* (2006.01)
*B62D 21/15* (2006.01)

(52) U.S. Cl.
CPC ............. *B60R 19/34* (2013.01); *B62D 21/152* (2013.01); *B62D 25/08* (2013.01); *B62D 25/082* (2013.01)

(58) Field of Classification Search
CPC ....... B62D 21/15; B62D 21/152; B62D 25/08; B62D 25/082; B62D 25/085; B60R 19/34
(Continued)

(56) References Cited

U.S. PATENT DOCUMENTS 3,819,224 A * 6/1974 Casey .................. B62D 21/152
188/377
8,056,926 B2 * 11/2011 Okabe ..................... B60R 19/34
180/311
(Continued)

FOREIGN PATENT DOCUMENTS

CN 101855110 10/2010
JP 2003-291854 A 10/2003
(Continued)

OTHER PUBLICATIONS

International Search Report issued Mar. 4, 2014, in PCT/JP2014/050168, filed Jan. 8, 2014.
(Continued)

*Primary Examiner* — Gregory Blankenship
(74) *Attorney, Agent, or Firm* — Oblon, McClelland, Maier & Neustadt, L.L.P.

(57) ABSTRACT

A vehicle front section structure includes a front side member that is formed with a front flange at a vehicle front-rear direction front end; a crash box that is joined to the front flange at a rear flange formed at a vehicle front-rear direction rear end; and a coupling member that is joined to a fender apron section at a vehicle rear end. The coupling member includes a joining plate formed at a vehicle front end side joined to the front flange in an interposed state between the front flange and the rear flange, with a front end side of a portion of the coupling member positioned at a vehicle width direction outer side of the front side member angled such that in plan view a rear side is separated further to the
(Continued)

vehicle width direction outer side from the front side member than the vehicle front side.

6 Claims, 13 Drawing Sheets

(58) Field of Classification Search
USPC ............... 296/187.09, 187.1, 193.09, 203.02
See application file for complete search history.

(56) References Cited

U.S. PATENT DOCUMENTS

| | | | | |
|---|---|---|---|---|
| 8,684,451 | B1* | 4/2014 | Park ..................... | B62D 25/082 |
| | | | | 296/203.02 |
| 9,004,576 | B2* | 4/2015 | Sakakibara .......... | B62D 25/085 |
| | | | | 293/133 |
| 2003/0184124 | A1 | 10/2003 | Yamaguchi | |
| 2005/0046165 | A1* | 3/2005 | Gomi .................. | B62D 25/082 |
| | | | | 280/781 |
| 2005/0077711 | A1 | 4/2005 | Yasui et al. | |
| 2007/0176443 | A1* | 8/2007 | Yasuhara ............. | B62D 21/152 |
| | | | | 293/133 |
| 2009/0140546 | A1* | 6/2009 | Okabe .................... | B60R 19/18 |
| | | | | 296/187.09 |
| 2010/0127531 | A1 | 5/2010 | Yasuhara et al. | |
| 2010/0259033 | A1* | 10/2010 | Okabe .................... | B60R 19/34 |
| | | | | 280/734 |
| 2011/0148151 | A1* | 6/2011 | Abe ........................ | B60R 19/34 |
| | | | | 296/203.02 |
| 2012/0007373 | A1* | 1/2012 | Boettcher ............... | B60R 19/24 |
| | | | | 293/132 |
| 2012/0086225 | A1* | 4/2012 | Matsuura ............. | B62D 21/152 |
| | | | | 293/132 |
| 2013/0207417 | A1* | 8/2013 | Kihara .................... | B60R 19/34 |
| | | | | 296/187.09 |
| 2013/0241233 | A1* | 9/2013 | Ohnaka ................ | B62D 21/152 |
| | | | | 296/187.1 |
| 2013/0249245 | A1* | 9/2013 | Sekiguchi ............ | B62D 25/082 |
| | | | | 296/187.09 |
| 2014/0159430 | A1* | 6/2014 | Mildner ................. | B62D 25/04 |
| | | | | 296/193.09 |
| 2014/0375082 | A1* | 12/2014 | Watanabe ............ | B62D 21/152 |
| | | | | 296/187.1 |
| 2015/0035316 | A1* | 2/2015 | Kuriyama ............ | B62D 25/082 |
| | | | | 296/187.1 |
| 2015/0054308 | A1* | 2/2015 | Mildner ............... | B62D 27/023 |
| | | | | 296/187.09 |
| 2015/0314810 | A1* | 11/2015 | Watanabe ................ | B60K 5/12 |
| | | | | 296/203.02 |
| 2015/0336614 | A1* | 11/2015 | Kim ..................... | B62D 25/082 |
| | | | | 296/187.09 |
| 2015/0360632 | A1* | 12/2015 | Nishida ................ | B62D 21/152 |
| | | | | 293/133 |
| 2015/0360633 | A1* | 12/2015 | Nishida ................ | B62D 21/152 |
| | | | | 293/133 |
| 2016/0039373 | A1* | 2/2016 | Yamada .................. | B60R 19/24 |
| | | | | 293/132 |
| 2016/0046250 | A1* | 2/2016 | Sotoyama ............ | B62D 21/152 |
| | | | | 293/155 |

FOREIGN PATENT DOCUMENTS

| | | |
|---|---|---|
| JP | 2003-300481 A | 10/2003 |
| JP | 2004-314899 A | 11/2004 |
| JP | 2005-112173 A | 4/2005 |
| JP | 2005-231435 A | 9/2005 |
| JP | 2005-231436 A | 9/2005 |
| JP | 2007-190964 A | 8/2007 |
| JP | 2009-154859 A | 7/2009 |
| JP | 2009-171032 A | 7/2009 |
| JP | 2010-125884 A | 6/2010 |
| JP | 2010-184706 A | 8/2010 |
| JP | 2013-193572 A | 9/2013 |
| JP | 2013-199233 A | 10/2013 |

OTHER PUBLICATIONS

English Translation of Response to Written Opinion Issued in PCT/JP2014/050168, filed Jan. 8, 2014.
Office Action mailed Jun. 30, 2016, in Chinese Patent Application No. 201480011243.3.

* cited by examiner

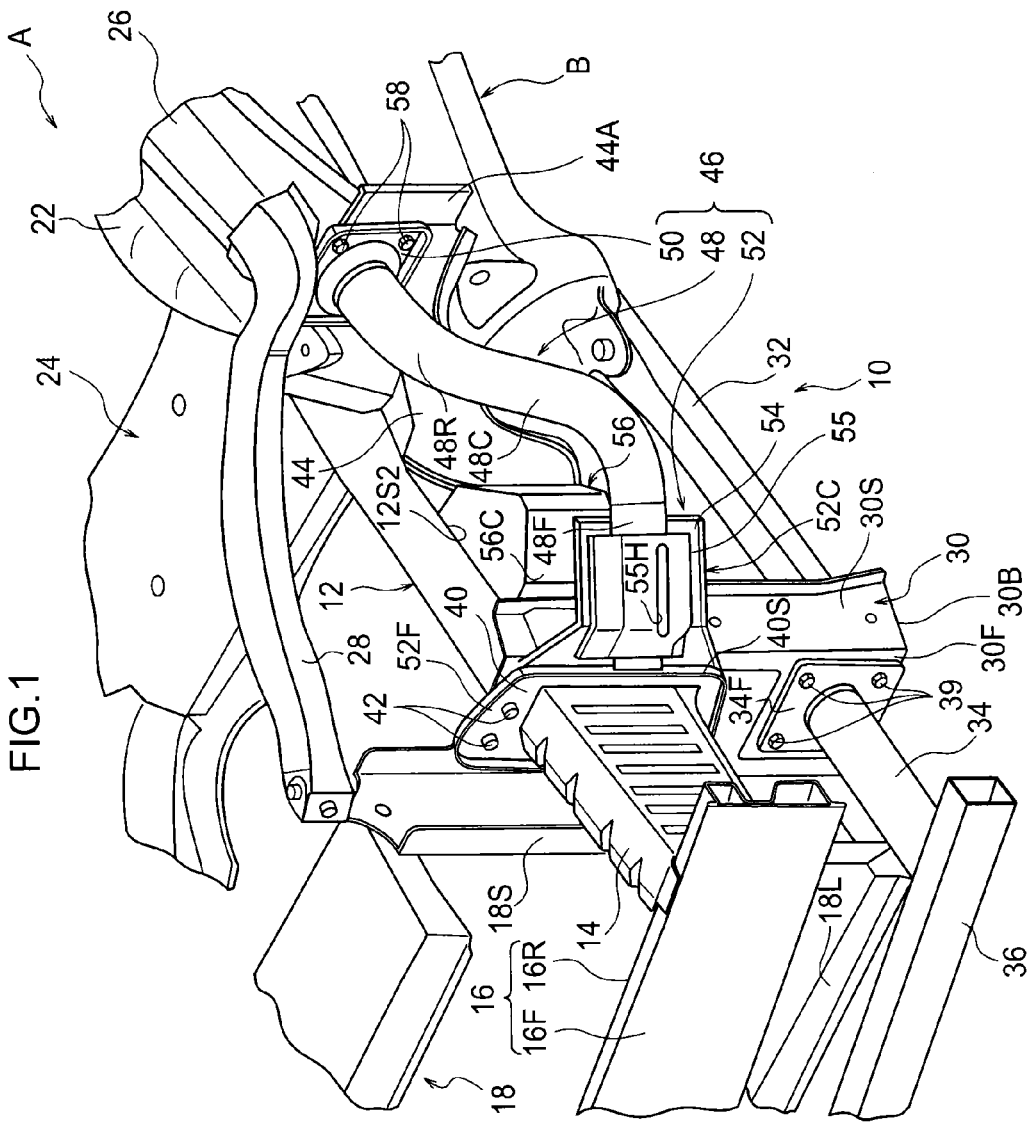
FIG.1
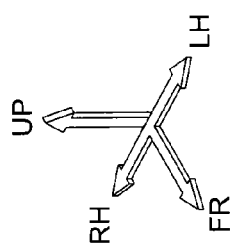

VEHICLE FRONT SECTION STRUCTURE

TECHNICAL FIELD

The present invention relates to a vehicle front section structure.

BACKGROUND ART

A structure is known in which a vehicle front end of a pipe member fixed to a vehicle rear end of an upper member running along an upper edge of a fender apron is fixed to a lower member in a state passing through a front side frame (see, for example, Japanese Patent Application Laid-Open (JP-A) No. 2009-171032). A structure is also known in which a coupling member is attached to a front end portion of apron reinforcement, and a face portion attached to a front end of the coupling member is fastened between a front side frame and a crash can (see, for example, JP-A No. 2005-231435).

SUMMARY OF INVENTION

Technical Problem

In the configuration of JP-A No. 2009-171032, a through hole is formed in the front side frame, and the through hole affects the energy absorption characteristics of the front side frame in a frontal collision. Special collision design is therefore required for a front side frame formed with a through hole. In the configurations of JP-A No. 2009-171032 and JP-A No. 2005-231435, a front end of a pipe member jutting out to the vehicle width direction outer side of the front side frame or a face portion forms a straight line along the vehicle width direction in plan view, thus leaving room for improvement from the perspective of suppressing deformation of a cabin in a small overlap collision.

An object of the present invention is to obtain a vehicle front section structure capable of suppressing deformation of a vehicle body in a small overlap collision using a coupling member that couples together a front side member and a fender apron section, while preventing or suppressing any detriment to collision performance of the front side member.

Solution to Problem

A vehicle front section structure according to a first aspect of the present invention includes: a front side member that is formed with a front flange at a vehicle front-rear direction front side; a crash box that is joined to the front flange at a rear flange formed at a vehicle front-rear direction rear side; and a coupling member that is joined to a fender apron section at a vehicle front-rear direction rear side, and that includes a joining plate formed at a vehicle front-rear direction front side joined to the front flange in an interposed state between the front flange and the rear flange, with a vehicle front-rear direction front side of a portion of the coupling member positioned at a vehicle width direction outer side of the front side member angled such that, in plan view, a vehicle front-rear direction rear side is separated further to the vehicle width direction outer side of the front side member than the vehicle front-rear direction front side.

According to the above aspect, the coupling member couples together the fender apron section and a vehicle front end side of the front side member. Namely, the coupling member is supported by the vehicle body at the vehicle width direction outer side of the front side member and at the vehicle front side of the fender apron section. In, for example, a frontal collision in which load is input at the vehicle width direction outer side of the front side member (referred to below as a "small overlap collision"), the coupling member (the portion at the front end side that is angled in plan view) impinges on the collision counterpart. The vehicle and the collision counterpart are accordingly displaced in the vehicle width direction, and the collision counterpart is prevented from intruding into the vehicle body of the vehicle.

Note that the joining plate of the coupling member is interposed between the front flange of the front side member and the rear flange of the crash box, and is joined at least to the front flange. Accordingly, the coupling member can be provided while any detriment to the energy absorption characteristics of the crash box and the front side member in a collision (collision performance in a frontal collision) is prevented or suppressed.

The vehicle front section structure of the above aspect accordingly enables deformation of the vehicle body in a small overlap collision to be suppressed by the coupling member that couples the front side member and the fender apron section together, while any detriment to the collision performance of the front side member is prevented or suppressed.

In the above aspect, configuration may be made wherein the coupling member includes a main body that has a closed cross-section structure in a cross-section orthogonal to a length direction of the main body, and to which the joining plate is joined at a vehicle front-rear direction front side; and the joining plate includes two plate members respectively joined to the main body by arc welding in a state sandwiching the main body in cross-section view.

According to the above aspect, the joining plate includes the two plate members, and the two plate members are respectively joined by arc welding to the main body that has a closed cross-section structure. The joining plate and the main body with the closed cross-section structure are thereby joined firmly together.

In the above aspect, configuration may be made wherein the joining plate of the coupling member is fastened together with the front flange and the rear flange by a fastener, and the vehicle front-rear direction rear side of the coupling member is fastened to the fender apron section by a fastener.

According to the above aspect, the front and rear of the coupling member are respectively joined to the front side member and the fender apron section by fastening structures, thereby facilitating increased commonality of vehicle body structures to vehicles that do not include the coupling member.

In the above aspect, configuration may be made wherein the front flange includes a side wall portion that faces a vehicle width direction inner face of the front side member.

According to the above aspect, load toward the vehicle rear is input to the coupling member (the portion that is angled in plan view) from the collision counterpart in a small overlap collision. When this occurs, a front end of the front side member is pulled toward the vehicle width direction outer side by the coupling member undergoing displacement (deformation) toward the vehicle rear. Moreover, the front end side of the front side member is pushed from the vehicle width direction inner side toward the vehicle width direction outer side by the side wall portion of the front flange. Vehicle width direction displacement between the vehicle and the collision counterpart is accordingly promoted.

In the above aspect, configuration may be made wherein the joining plate is joined to the front flange at least at a portion at the vehicle width direction inner side of a vehicle width direction center of the front side member.

According to the above aspect, when load toward the vehicle rear is input to the coupling member from the collision counterpart in a small overlap collision, a front end of the front side member is pulled toward the vehicle width direction outer side by the coupling member undergoing displacement (deformation) toward the vehicle rear. When this occurs, the front end portion of the front side member is effectively pulled toward the vehicle width direction outer side at the portion on the vehicle width direction inner side to which the coupling member is joined. Vehicle width direction displacement between the vehicle and the collision counterpart is accordingly promoted.

In the above aspect, configuration may be made wherein the joining plate is joined to the front flange at a portion at the vehicle width direction inner side of a vehicle width direction center of the front side member and at a portion at the vehicle width direction outer side of the vehicle width direction center of the front side member.

According to the above aspect, when load toward the vehicle rear is input to the coupling member from the collision counterpart in a small overlap collision, a front end of the front side member is pulled toward the vehicle width direction outer side by the coupling member undergoing displacement (deformation) toward the vehicle rear. When this occurs, the front end portion of the front side member is effectively pulled toward the vehicle width direction outer side while distributing the load between the vehicle width direction inner and outer portions to which the coupling member is joined. Vehicle width direction displacement between the vehicle and the collision counterpart is accordingly effectively promoted.

Effects of Invention

The present invention exhibits the excellent advantageous effect of enabling deformation of a vehicle body to be suppressed in a small overlap collision using a coupling member that couples together a front side member and a fender apron section, while preventing or suppressing any detriment to collision performance of the front side member.

BRIEF DESCRIPTION OF DRAWINGS

FIG. 1 is an enlarged perspective view illustrating relevant portions of a vehicle front section structure according to an exemplary embodiment of the present invention.

DESCRIPTION OF EMBODIMENTS

First Exemplary Embodiment

Figure 2:
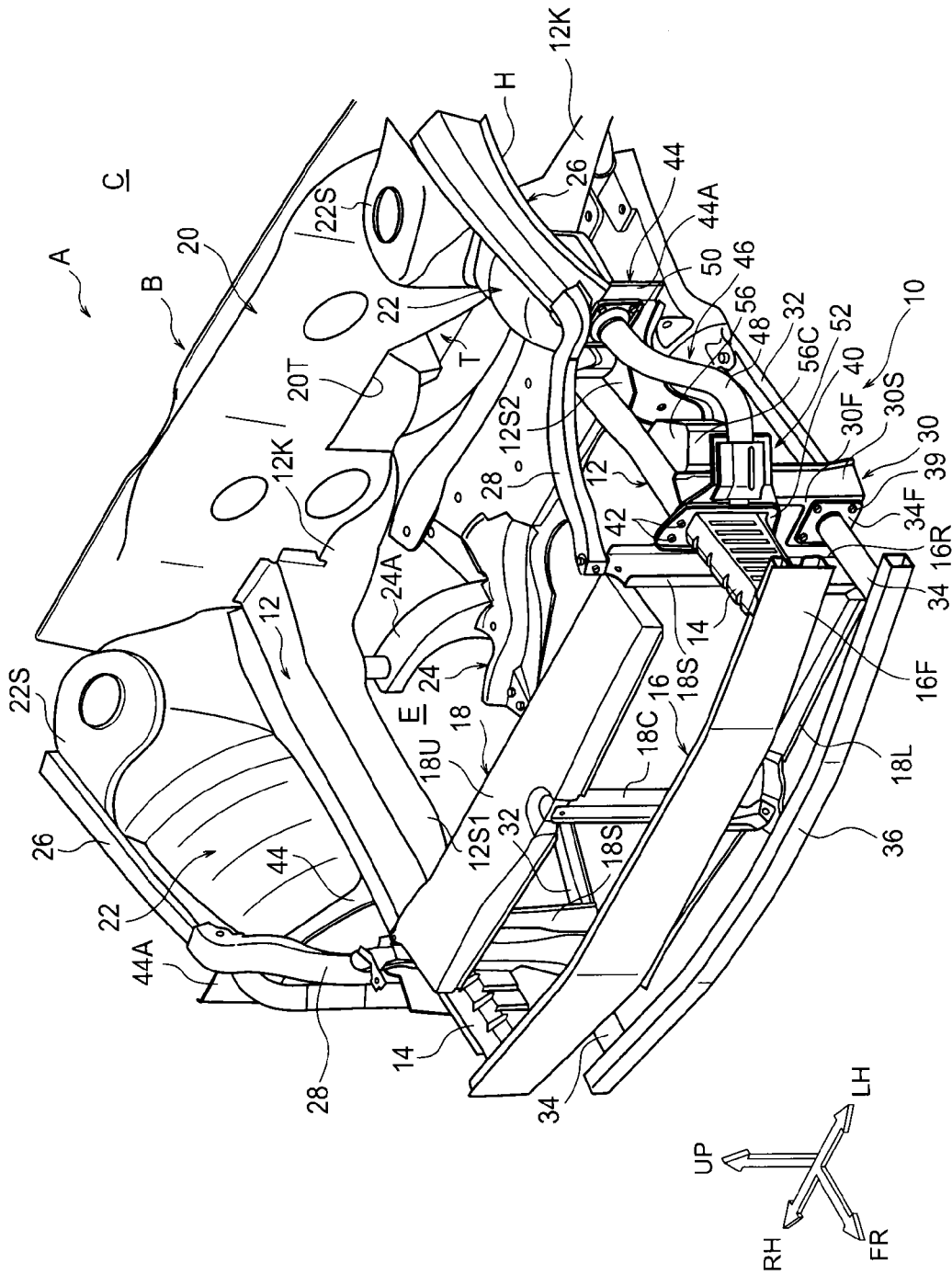
FIG. 2 is a perspective view schematically illustrating an overall configuration of the vehicle front section structure according to the exemplary embodiment of the present invention.

Explanation follows regarding a vehicle front section structure 10 according to a first exemplary embodiment of the present invention, with reference to FIG. 1 to FIG. 8E. In the drawings, the arrow FR indicates the front direction in the vehicle front-rear direction, the arrow UP indicates the upward direction in the vehicle up-down direction, the arrow RH indicates the right side (one vehicle width direction) when facing in the front direction, and the arrow LH indicates the left side (the other vehicle width direction) when facing in the front direction, as appropriate. In the following explanation, unless specifically stated otherwise, the front-rear, up-down, and left-right directions refer to front and rear in the vehicle front-rear direction, up and down in the vehicle up-down direction, and left and right when facing in the direction of travel.

Basic Configuration of Vehicle Front Section

FIG. 2 is a perspective view illustrating a schematic configuration of a front section of a car A applied with the vehicle front section structure. As illustrated in FIG. 2, a vehicle body B of the car A includes a pair of left and right front side members 12. The front side members 12 are respectively disposed with their length direction in the front-rear direction, and are disposed side-by-side in the vehicle width direction. Each of the front side members 12 is joined through a crash box 14 to bumper reinforcement 16 that is configured having its length direction in the vehicle width direction. Namely, the bumper reinforcement 16 spans between front ends of the left and right crash boxes 14.

The bumper reinforcement 16 of the present exemplary embodiment has a B-shaped cross-section profile as taken orthogonally to its length direction. Specifically, the bumper reinforcement 16 is configured with a B-shaped cross-section profile by joining a front panel 16F to respective flanges of a rear panel 16R that is configured by a pair of upper and lower recessed portions that are open toward the front, the recessed portions being formed between three flanges, namely an upper, an intermediate, and a lower flange, so as to configure two closed cross-section portions in a row above and below each other. Note that a recessed portion that opens toward the rear is configured between the upper and lower closed cross-section portions. Although not illustrated in the drawings, beads that project out toward the rear (toward the inner sides of the closed cross-sections) so as to open toward the front may be formed across the vehicle width direction of the front panel 16F at portions configuring front walls of the upper and lower closed cross-sections. The bumper reinforcement 16 is configured with high rigidity and strength with respect to bending due to employing a structure such as in this example.

A radiator support 18 is attached between front portions of the left and right front side members 12. In the radiator support 18, both vehicle width direction ends of an upper member 18U and a lower member 18L that face each other from above and below are joined together by a pair of left and right side members 18S, such that the radiator support 18 is configured including a portion formed with a rectangular frame shape as viewed from the front. In the present exemplary embodiment, a center member 18C is provided to couple together vehicle width direction center portions of the upper member 18U and the lower member 18L. Note that the side members 18S of the present exemplary embodiment each include a jutting out portion that juts out toward the vehicle width direction outer side, and together with a flange 52F, described later, the jutting out portion is interposed between and fastened together with a front flange 30 and a rear flange 40, described later (see FIG. 5).

A dash panel 20 that partitions an engine compartment E from a cabin C is joined to a rear end side of each of the front side members 12. More specifically, rear portions of the front side members 12 are each configured with a kick portion 12K inclined such that a rear side is positioned lower than a front side thereof. Each kick portion 12K is joined to a front face side of the dash panel 20. A rear lower end of each kick portion 12K is connected to underfloor reinforcement that is joined to the underneath of a floor panel, not illustrated in the drawings. A tunnel section 20T that is connected to a floor tunnel T is formed at a vehicle width direction central portion of the dash panel 20.

A fender apron 22 is provided at the vehicle width direction outer side of each of the front side members 12. In the present exemplary embodiment, each fender apron 22 forms a wheel house H that accommodates a front wheel, not illustrated in the drawings, in a manner allowing the front wheel to be steered, and is also integrally formed with a suspension tower 22S. Each suspension tower 22S is configured to support an upper end portion of a suspension, not illustrated in the drawings, supporting the front wheels accommodated in the wheel houses H. Moreover, a suspension member 24 that supports the suspension is attached to each front side member 12. In the present exemplary embodiment, the suspension member 24 is an I-shaped suspension member with its length in the vehicle width direction, and both ends of the suspension member 24 in the vehicle width direction support a lower arm, not illustrated in the drawings, configuring the suspension, such that the lower arm is rotatable about an axis running along the vehicle front-rear direction.

The suspension member 24 is joined to the front side members 12 at plural locations separated from each other to the front and rear. Specifically, front portions of both vehicle width direction outer ends of the suspension member 24 are joined through arm members 24A to front-rear direction intermediate portions of the front side members 12 from below. Although not illustrated in the drawings, rear portions of both vehicle width direction outer ends of the suspension member 24 are joined, either directly or indirectly, to the rear lower end portions of the kick portions 12K of the front side members 12.

A portion at a vehicle width direction inner end and up-down direction lower end of each fender apron 22 is joined to the corresponding front side member 12. A portion at a vehicle width direction outer end and up-down direction upper end of each fender apron 22 is joined to an apron upper member 26, this being a framework member having its length direction in the front-rear direction. Each apron upper member 26 is disposed following a vehicle width direction outer end of a front upper section of the vehicle body B, and a rear end portion of each apron upper member 26 is joined to a cowl portion, not illustrated in the drawings. In other words, a rear end of the apron upper member 26 is supported by the dash panel 20 through the cowl portion. A front end side of each apron upper member 26 is coupled through an extension 28 to an upper end of the side member 18S (a vehicle width direction outer end portion of the upper member 18U) configuring the radiator support 18.

Although described in more detail later, the front flange 30 for joining to the crash box 14 is provided at a front end of each front side member 12. The front flange 30 is a member formed substantially in a hat shape opening toward the rear in plan view, and with its length running in the up-down direction. The front flange 30 projects out downward with respect to the front side member 12. A lower member 32, this being a member with its length running in the front-rear direction, couples between a lower portion of each front flange 30 and a vehicle width direction outer end portion of a front portion of the suspension member 24.

A flange 34F provided at a rear end of a pipe member 34 with its length in the front-rear direction is joined by fastening in the front-rear direction to a front face of the lower portion of each front flange 30. Each pipe member 34 is joined by fastening with fasteners 39, such as nuts and bolts as illustrated in FIG. 1, in a state in which the flange 34F formed at the rear end of the pipe member 34 is in face-to-face contact with a lower portion of a flange body 30F. A lower side bumper reinforcement 36 spans between front ends of the left and right pipe members 34.

In the configuration described above, a power unit P (see FIG. 3), this being a drive source of the car A, is installed inner side the engine compartment E. The power unit P is directly or indirectly supported by locations configuring the vehicle body B, such as the left and right front side members 12 and the suspension member 24. The power unit P is disposed between the left and right front side members.

Configuration of Relevant Portions

Flange Fastening Structure

Since the relevant portions of the vehicle front section structure 10 are basically configured with left-right symmetry, the following explanation focuses mainly on the structure on the left side. As illustrated in FIG. 1, the front flange 30 described above is joined to the front end of the front side member 12. The front flange 30 includes at least the front-facing flange body 30F, a pair of side walls 30S extending from both left and right ends of the flange body 30F toward the rear, and a bottom wall 30B connecting the flange body 30F together with lower ends of the pair of side walls 30S.

Figure 3:
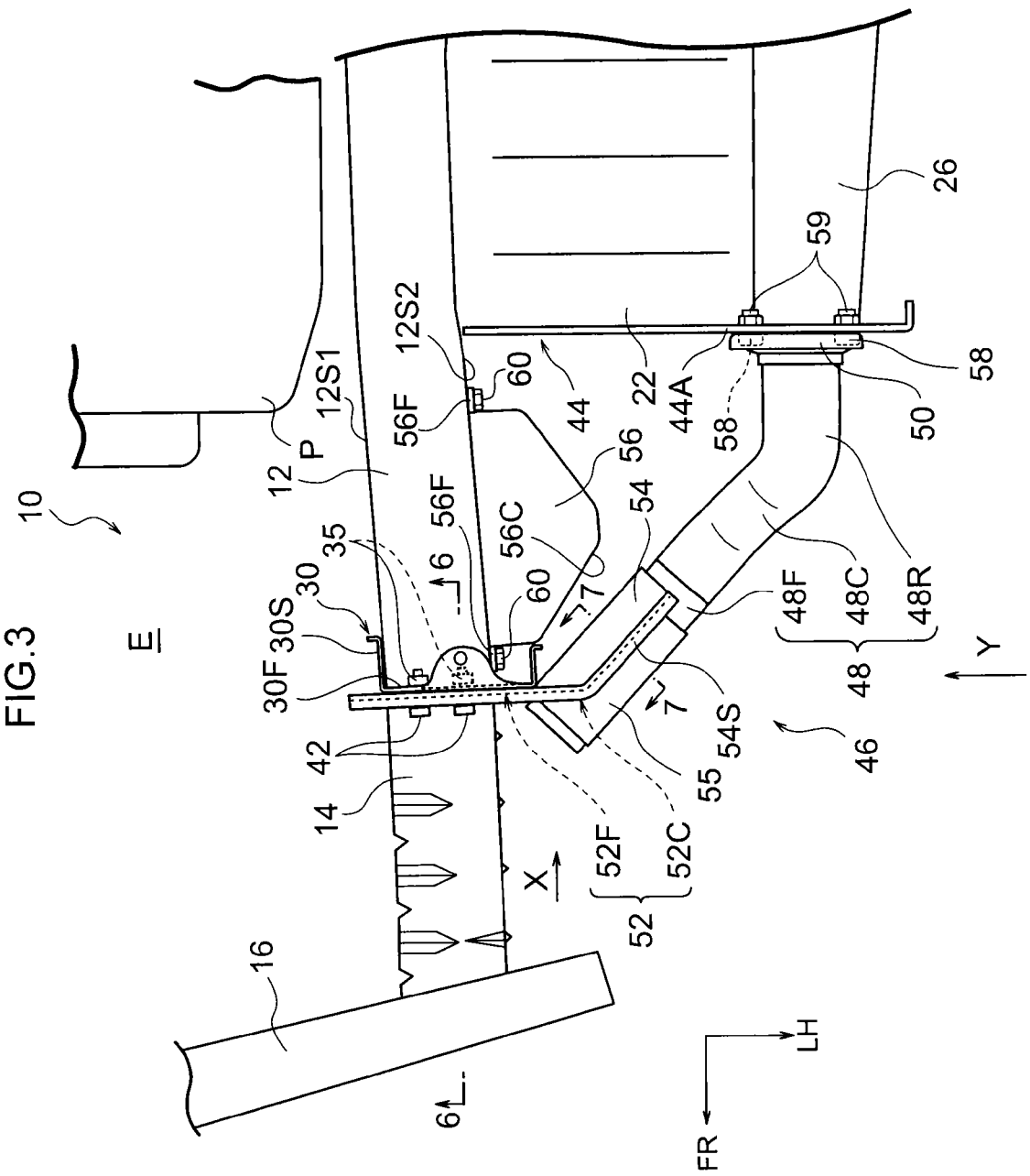
FIG. 3 is an enlarged plan view illustrating relevant portions of the vehicle front section structure according to the exemplary embodiment of the present invention.
Figure 5:
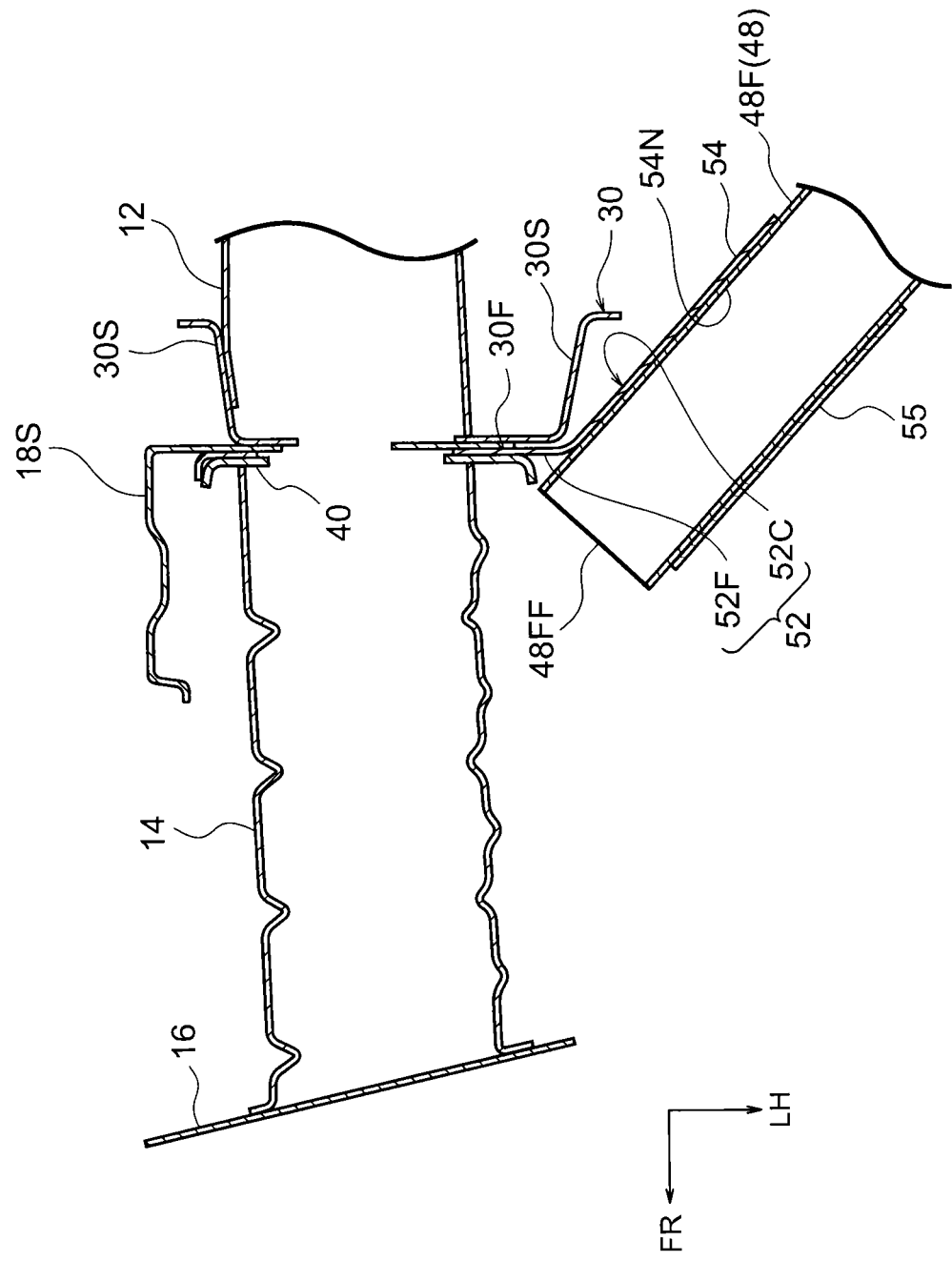
FIG. 5 is a cross-section taken along line 5-5 in FIG. 4.
Figure 6:
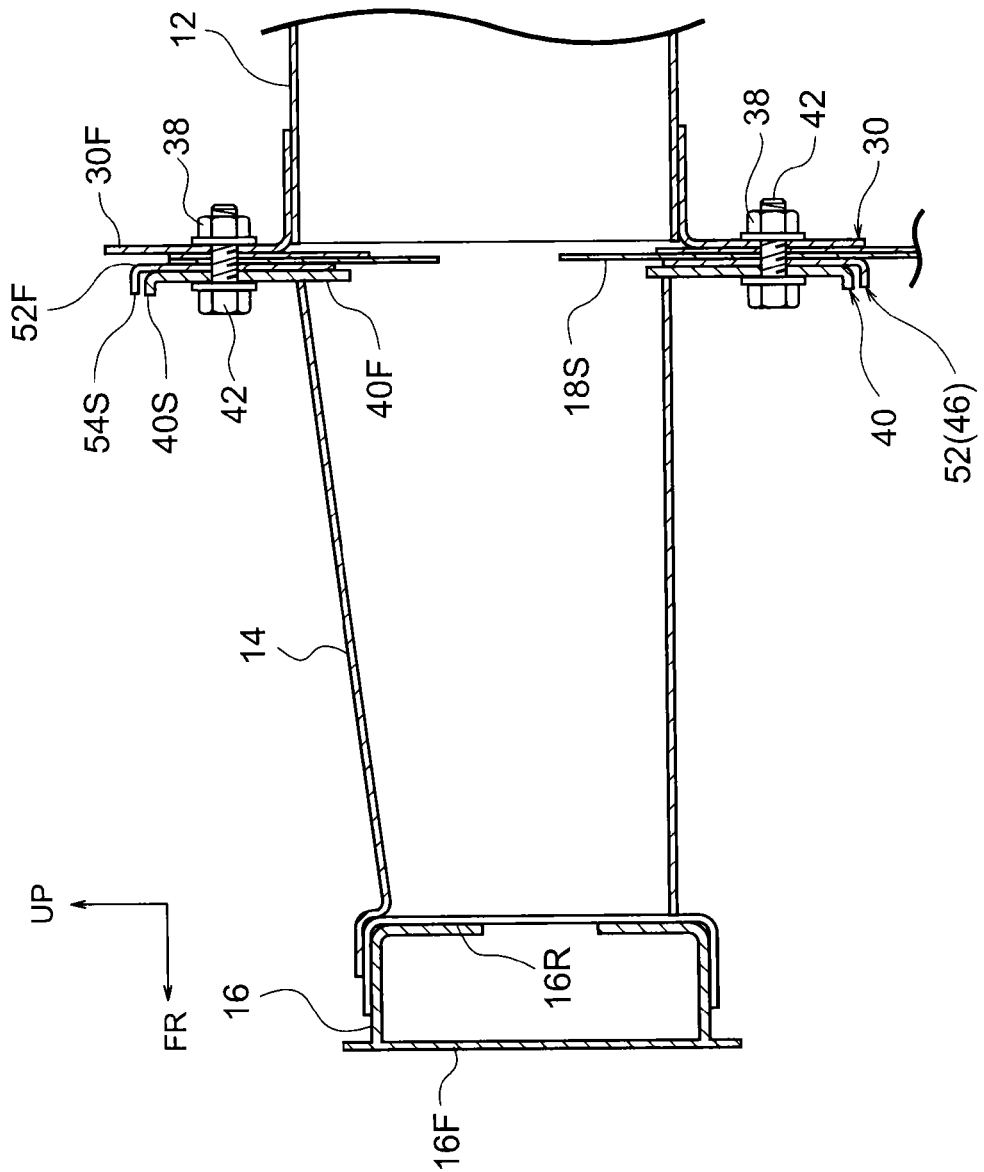
FIG. 6 is a cross-section taken along line 6-6 in FIG. 3.

As illustrated FIG. 3, FIG. 6, and so on, plural weld nuts 38 (four in the present exemplary embodiment, forming a rectangular shape with its length running from top to bottom as viewed from the front) are provided at a back face of the flange body 30F. As illustrated in FIG. 3 and FIG. 5, the side wall 30S on the vehicle width direction inner side of the front flange 30 is disposed either in contact with, or extremely close to, a side face 12S1, this being an inner face of the front side member 12 that is facing inner side in the vehicle width direction. This vehicle width direction inner side wall 30S corresponds to a side wall portion.

As illustrated in FIG. 1, the rear flange 40 is provided to a rear end of the crash box 14. The rear flange 40 is configured with peripheral walls 40S projecting out a short distance toward the front from peripheral edges of a flange body 40F. Although not illustrated in the drawings, bolt insertion holes are formed in the flange body 40F at positions corresponding to the weld nuts 38 of the flange body 30F.

The crash box 14 is joined to the front end of the front side member 12 by fastening the rear flange 40 to the front flange 30 by screwing bolts 42 together with the weld nuts 38. The flange 52F, serving as a joining plate of a coupling member 46, described later, is interposed between and fastened together with the rear flange 40 of the crash box 14 and the front flange 30 of the front side member 12.

The four fastening positions where the weld nuts 38 and the bolts 42 are screwed together are respectively disposed so as to be on both the upper and lower sides of a center line splitting a cross-section orthogonal to the length direction of the front side member 12 into top and bottom, and on both the left and right sides of a center line splitting the cross-section into left and right.

Apron Upper Member

A forward facing plate shaped end plate 44 is joined to a front end of the apron upper member 26. The end plate 44 extends along a front edge of the fender apron 22 from a join portion with the apron upper member 26 toward the vehicle width direction inner side, and is also joined to the front edge of the fender apron 22. A vehicle width direction outer end of the end plate 44, this being the join portion with the apron upper member 26, configures a rectangular plate portion 44A that is substantially square-shaped as viewed from the front. A location where the end plate 44 is also joined to the front edge of the fender apron 22 forms a substantially arc shape as viewed from the front, and is connected to a vehicle width direction inner and lower side end portion of the rectangular plate portion 44A.

In the present exemplary embodiment, a structural body configured by joining together the fender apron 22, the apron upper member 26, and the end plate 44, or any one or two of these members in isolation, corresponds to a fender apron of the present invention.

Coupling Member

The vehicle front section structure 10 includes the coupling member 46 that couples the front end of the apron upper member 26 to the front end of the front side member 12. The coupling member 46 is configured with main portions of a pipe 48, serving as a main body having a closed cross-section structure, a rear flange 50 provided to a rear end of the pipe 48, and a front side join portion 52 provided at a front end of the pipe 48.

Figure 4:
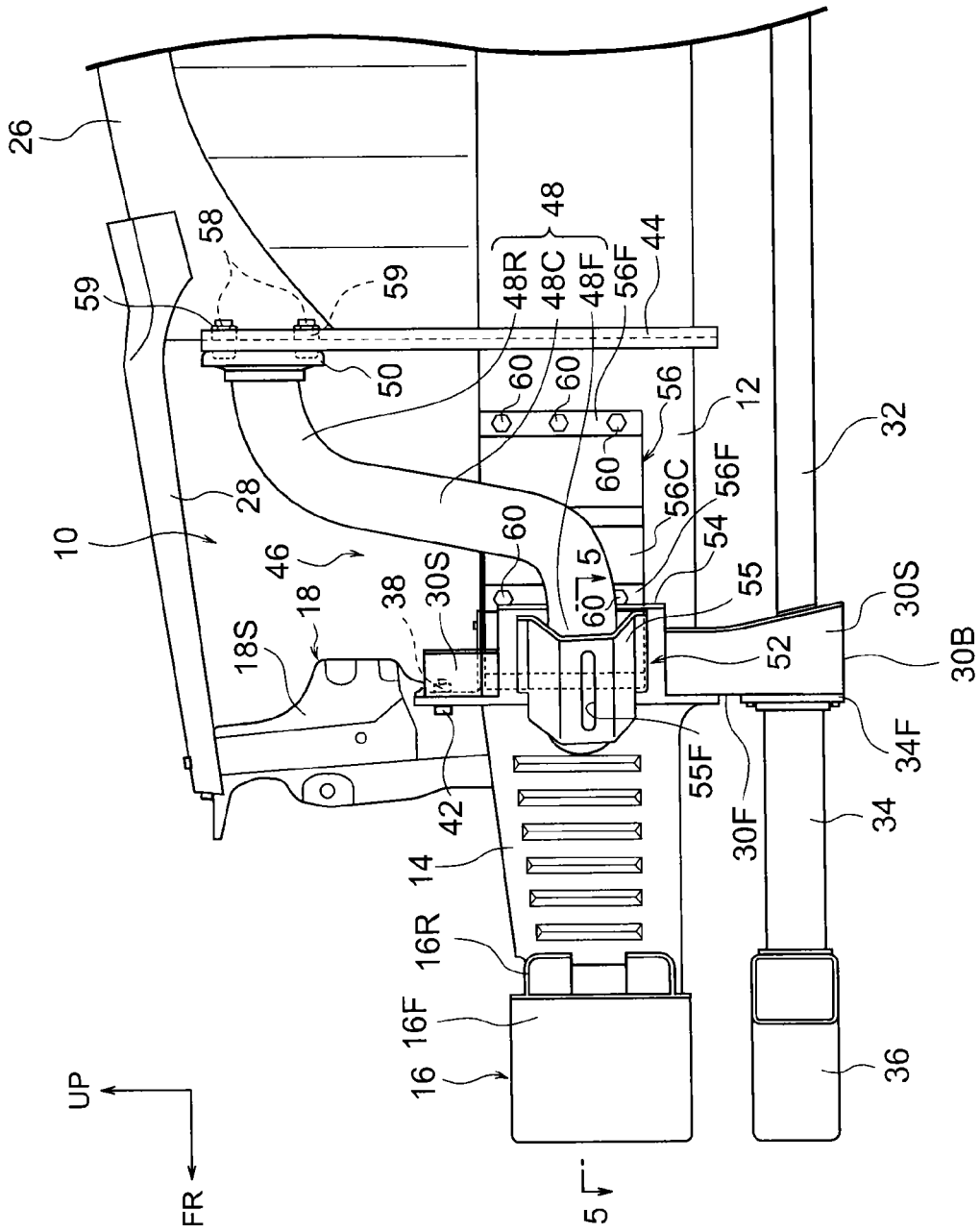
FIG. 4 is an enlarged side view illustrating relevant portions of the vehicle front section structure according to the exemplary embodiment of the present invention.

As illustrated in FIG. 3 and FIG. 4, the rear flange 50 is joined to the front end of the apron upper member 26 by being joined by fastening to the rectangular plate portion 44A of the end plate 44 by screwing together bolts 58 and weld nuts 59. Namely, the coupling member 46 is joined to the apron upper member 26 through the end plate 44. Accordingly, the fastening direction of the coupling member 46 to the apron upper member 26, namely to the end plate 44, is substantially aligned with the front-rear direction.

As illustrated in FIG. 1, the pipe 48 is, for example, formed by bending a pipe member, and is curved in the manner described below so as to couple together the front end of the apron upper member 26 and the front end of the front side member 12, these being at different positions to each other in the front-rear direction, the up-down direction, and the vehicle width direction. In the present exemplary embodiment, the pipe 48 is formed such that a rear portion 48R, an intermediate portion 48C, and a front portion 48F are connected in this sequence from the rear.

The rear portion 48R is formed in a circular arc shape as viewed from the side, is disposed such that an upper rear end thereof is in a direction tangential to the front-rear direction, and is joined to the rear flange 50. The front portion 48F is formed in a straight line shape angled such that a rear side of the front portion 48F is separated further to the vehicle width direction outer side of the front side member 12 than a front side of the front portion 48F in plan view. A front end 48FF of the front portion 48F configures an open end opening toward the front and the vehicle width direction inner side at the vehicle width direction outer side of the crash box 14. The intermediate portion 48C is formed to connect the rear portion 48R and the front portion 48F. Specifically, the intermediate portion 48C is configured by a straight portion extending downward toward the front along a direction tangential to a front lower end of the rear portion 48R, and a circular arc shaped portion smoothly connecting a front lower end of the straight portion to a rear end of the front portion 48F (so as to form boundaries thereto along respective tangential directions).

As illustrated in FIG. 3, in plan view of the pipe 48, the rear portion 48R mainly has a straight line shape running along the front-rear direction, and the intermediate portion 48C and the front portion 48F are formed in a straight line shape angled such that the rear side is separated further to the vehicle width direction outer side of the front side member 12 than the front side. In plan view, a vehicle width direction inner side end portion of the front end 48FF of the front portion 48F (hidden by the flange 52F, described later, in FIG. 1) is positioned at (in the vicinity of) the vehicle width direction outer side of the join portion between the front side member 12 and the crash box 14.

As illustrated in FIG. 4, in side view of the pipe 48, the front portion 48F (a portion mainly hidden by the flange 52F, described later, in FIG. 4) configures a horizontal portion running in a substantially horizontal plane (along the length direction of the front side member 12). The front side join portion 52 is joined to the substantially horizontal front portion 48F. In other words, as viewed from the side, a portion of the main body extending rearward from the front side join portion 52 along the length direction of the front side member 12 (the horizontal direction) configures the front portion 48F, and the front portion 48F corresponds to a horizontal portion of the present invention.

The front side join portion 52 is configured including the flange 52F that is fastened together with the rear flange 40 of the crash box 14 and the front flange 30 of the front side member 12, and a pipe-joined portion 52C that is joined to the front portion 48F of the pipe 48. Specifically, as illustrated in FIG. 1, and in FIG. 3 to FIG. 5, the front side join portion 52 has a two-member configuration including a main panel 54 and a reinforcement panel 55, both of which serve as plate members. The flange 52F is configured by the main panel 54, is formed in a forward-facing flat plate shape, and is formed with four bolt insertion holes (not illustrated in the drawings) through which the bolts are inserted. Peripheral walls 54S project out a short distance toward the front from peripheral edges of the main panel 54.

Figure 7:
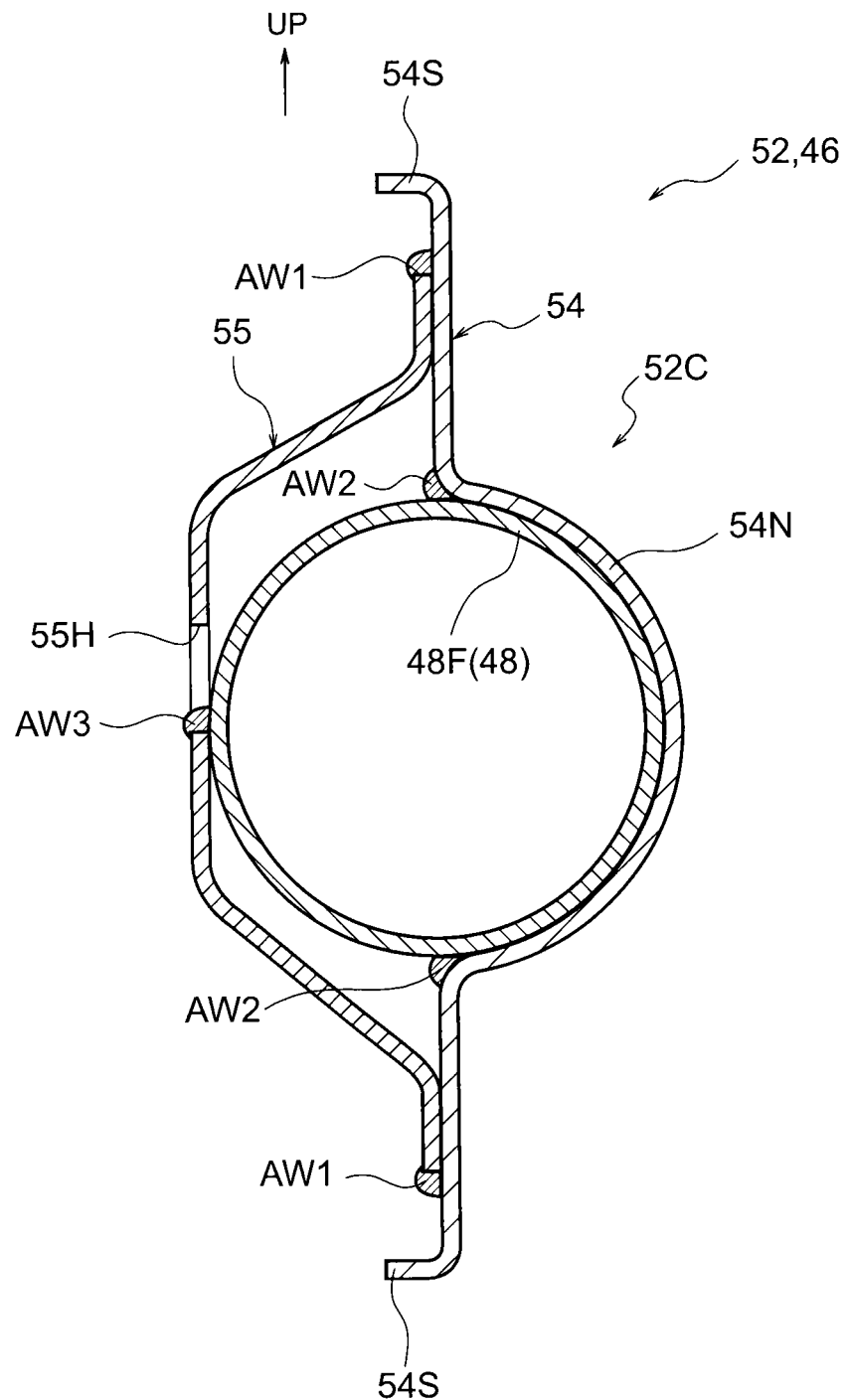
FIG. 7 is a cross-section taken along line 7-7 in FIG. 3.

A portion of the main panel 54 at the vehicle width direction outer side of the portion configuring the flange 52F is angled to follow the length direction of the front portion 48F of the pipe 48, and is formed with a recess 54N that is recessed in a semicircular shape so as to cover the rear of the front portion. As illustrated in FIG. 7, the reinforcement panel 55 is formed with a hat shaped cross-section that encloses the pipe 48 that fits into the recess 54N. Accordingly, in the pipe-joined portion 52C, both the main panel 54 and the reinforcement panel 55 jut out at both sides along the up-down direction of the pipe 48.

In the pipe-joined portion 52C, the pipe 48 and the front side join portion 52 are joined together by welding at respective portions in a state in which the front portion 48F is fitted into the recess 54N and the pipe 48 is covered by the reinforcement panel 55. More specifically, the reinforcement panel 55 and the main panel 54 are joined together by performing a long weld (either continuously or intermittently; the same applies below) along the length direction of the front portion 48F (a direction orthogonal to the cross-section illustrated in FIG. 7) at arc weld portions AW1 illustrated in FIG. 7. The main panel 54 and the front portion 48F of the pipe 48 are joined together by performing a long weld along the length direction of the front portion 48F at arc weld portions AW2. The reinforcement panel 55 and the front portion 48F of the pipe 48 are also joined together by performing a long weld along the length direction of the front portion 48F at an arc weld portion AW3.

The reinforcement panel 55 is superimposed with the main panel 54 at two locations straddling the recess 54N in the up-down direction, and the arc weld portions AW1 are configured by fillet welds (superimposed joints) along upper and lower edge portions of the reinforcement panel 55. An elongated hole 55H, with its length along the length direction of the front portion 48F, is formed at an up-down direction intermediate portion of the reinforcement panel 55, and the arc weld portion AW3 is configured by a fillet weld (a superimposed joint) along a lower edge of the elongated hole 55H. The arc weld portions AW2 are formed by arc welding open ends of the recess 54N and a peripheral face of (the front portion 48F of) the pipe 48 along the length direction of the front portion 48F.

The front side join portion 52 may be understood as a configuration in which the flange 52F is a single-member configuration of the main panel 54, and the pipe-joined portion 52C is a two-member configuration of the main panel 54 and the reinforcement panel 55.

In the coupling member 46 described above, the rear flange 50 is joined to the end plate 44 by fastening from the front, and the flange 52F of the front side join portion 52 is fastened together with the rear flange 40 and the front flange 30 in an interposed state therebetween. The coupling member 46 is thereby configured to couple the front end of the apron upper member 26 and the front end of the front side member 12 together.

In other words, the coupling member 46 of the present exemplary embodiment may be understood as a framework member supported by the front side member 12 and the apron upper member 26 in a state in which the coupling member 46 juts out toward the vehicle width direction outer side with respect to the front side member 12. As illustrated in FIG. 3, the coupling member 46 is also configured jutting out by a large amount to the vehicle width direction outer side with respect to the bumper reinforcement 16. The coupling member 46 may accordingly be understood as being, in effect, an input location of collision load in a collision at the vehicle width direction outer side of the front side member 12. [0052] In the present exemplary embodiment, as described above, a portion on the front end side of the coupling member 46, namely the front portion 48F and the intermediate portion 48C of the pipe 48, and the pipe-joined portion 52C of the front side join portion 52, are angled such that the rear side is separated further from the front side member 12 than the front side in plan view. As illustrated in FIG. 3, the front end 48FF of the pipe 48 configuring the coupling member 46 projects out further to the front than the front end of the front side member 12.

Spacer

As illustrated in FIG. 1 and FIG. 3, a spacer 56 is provided to a portion of a vehicle width direction outward-facing side face 12S2 of the front side member 12 that is at the vehicle width direction inner side of the coupling member 46. In other words, the spacer 56 is disposed at a portion positioned between the front side member 12 and the coupling member 46 in plan view. Moreover, as illustrated in FIG. 4, viewed from the side, the spacer 56 is disposed overlapping in the up-down direction with portions at front end sides of the front side member 12 and the coupling member 46.

More specifically, the spacer 56 overlaps with the front portion 48F of the pipe 48 configuring the coupling member 46 in the vehicle width direction and the up-down direction as viewed from the front (as viewed along arrow X in FIG. 3), and overlaps with the front portion 48F in the front-rear direction and the up-down direction as viewed from the side (as viewed along arrow Y in FIG. 3, see also FIG. 4). Namely, the spacer 56 is disposed facing the front portion 48F of the coupling member 46. The spacer 56 may also be understood as being disposed facing the pipe-joined portion 52C that serves as an opposing face portion of the front side join portion 52 of the coupling member 46.

Thus, a configuration is made such that when the coupling member 46 receives load toward the rear and deforms, (a portion of the front side join portion 52 that fits together with) the front portion 48F of the pipe 48 configuring the coupling member 46 impinges on the spacer 56. A portion of the spacer 56 on which this deformed coupling member 46 impinges configures an angled face 56C that is angled so as to face toward the vehicle width direction outer side and the front in plan view.

The spacer 56 is joined to a portion of the front side member 12 positioned slightly in front of the power unit P, and projects out from the side face 12S2 of the front side member 12 toward the vehicle width direction outer side at this portion. In the present exemplary embodiment, as illustrated in FIG. 3 and FIG. 4, the joining structure of the spacer 56 to the front side member 12 employs fastening with fasteners including bolts 60 at flanges 56F jutting out to the front and rear of the spacer 56.

The spacer 56 is configured to function as a load transmission member that transmits load from the coupling member 46 to the front side member 12 when the coupling member 46 impinges on the spacer 56 as described above. This load transmission promotes folding of the front side member 12 in the vicinity of the power unit P, as will be explained later related to the operation of the present exemplary embodiment.

The spacer 56 may be configured employing a lightweight (low density) material such as aluminum (or an alloy thereof) or resin, as long as it functions as a load transmission member as described above.

Operation

Explanation Follows Regarding Operation of the Present Exemplary Embodiment.

Operation in a Small Overlap Collision

Explanation follows with reference to FIGS. 8A to 8E, regarding operation of the car A applied with the vehicle front section structure 10 configured as described above in the event of a small overlap collision, this being a collision in which a colliding body (barrier Br) collides at the vehicle width direction outer side of the front side member 12. The illustrated example shows a case in which the barrier Br has collided at the vehicle width direction outer side of the front side member 12 on the left side. Note that the bumper reinforcement and the like are not illustrated in FIG. 8B to FIG. 8E following the collision.

Figure 8A:
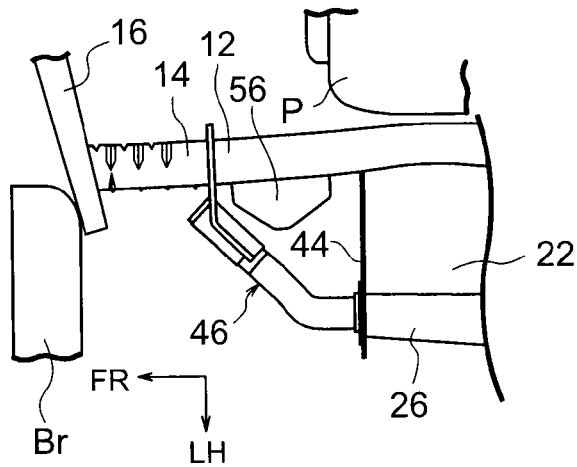
FIG. 8A is a plan view schematically illustrating operation during an initial stage of a small overlap collision to a vehicle front section structure according to a first exemplary embodiment of the present invention.
Figure 8B:
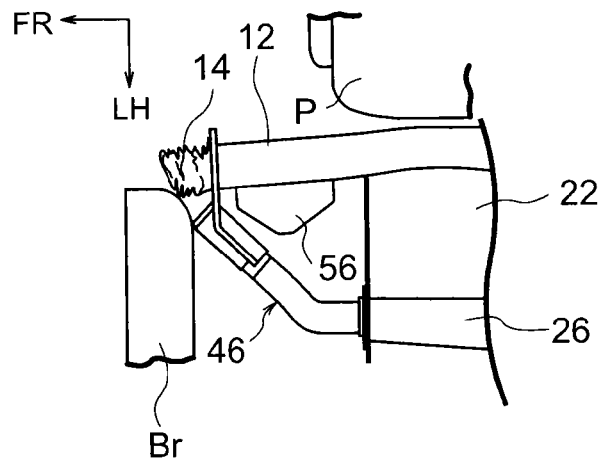
FIG. 8B is a plan view schematically illustrating a compressed state of a crash box during a small overlap collision to the vehicle front section structure according to the first exemplary embodiment of the present invention.

In an initial stage of the small overlap collision described above, as illustrated in FIG. 8A, rearward load is input from the barrier Br to a portion of the bumper reinforcement 16 at the vehicle width direction outer side of the front side member 12. When the high strength bumper reinforcement 16 with a B-shaped cross-section transmits collision load to the crash box 14, the crash box 14 is compressed in the front-rear direction, as illustrated in FIG. 8B. Energy is accordingly absorbed in the initial stage of the collision.

Figure 8C:
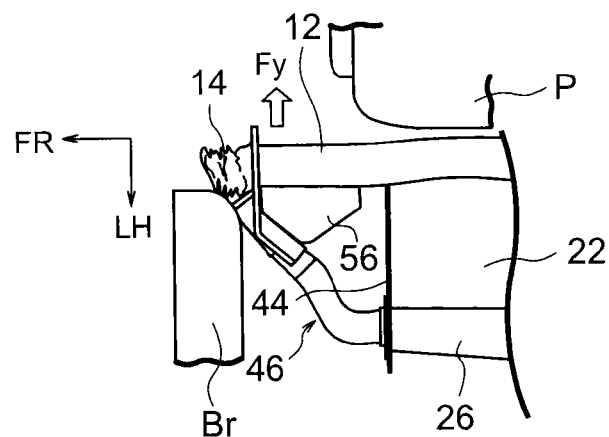
FIG. 8C is a plan view schematically illustrating a state in which a barrier impinges on a coupling member during a small overlap collision to the vehicle front section structure according to the first exemplary embodiment of the present invention.

Next, when the barrier Br reaches a location impinging on the coupling member 46, as illustrated in FIG. 8C, a load Fy toward the vehicle width direction inner side is generated in the front portion 48F, where the pipe 48 of the coupling member 46 is angled in plan view. The load Fy acts as a force in a direction to move the car A and the barrier Br apart in the vehicle width direction. Namely, the car A and the barrier Br are displaced in the vehicle width direction due to the barrier Br impinging on the coupling member 46, promoting the car A and the barrier Br to slide past one another. The barrier Br is thereby prevented from intruding into the car A.

Figure 8D:
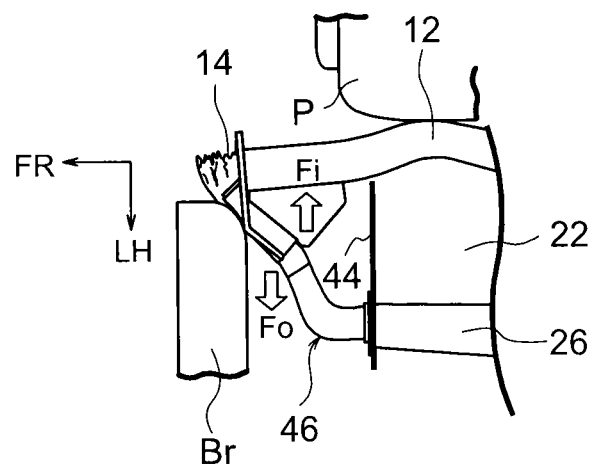
FIG. 8D is a plan view schematically illustrating a state in which load from a coupling member acts on a front side member during a small overlap collision to the vehicle front section structure according to the first exemplary embodiment of the present invention.
Figure 8E:
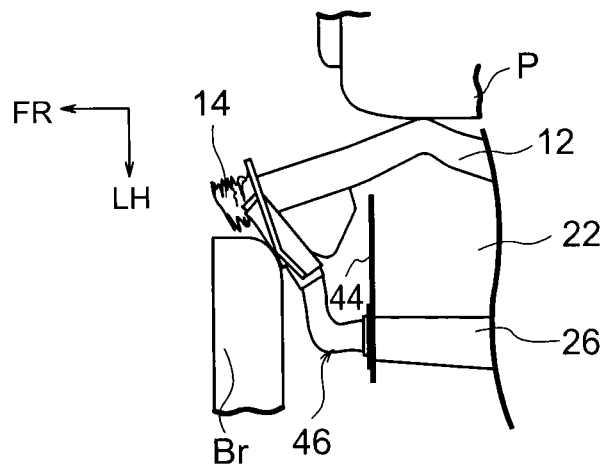
FIG. 8E is a plan view schematically illustrating a state in which the front side member is folded due to load from the coupling member during a small overlap collision to the vehicle front section structure according to the first exemplary embodiment of the present invention.

When the barrier Br pushes the coupling member 46 toward the rear, the front end of the front side member 12 is pulled toward the vehicle width direction outer side (the force Fo in FIG. 8D) by rearward deformation or displacement of the coupling member 46. As illustrated in FIG. 8D, when the coupling member 46 undergoes further deformation due to the load from the barrier Br and impinges on the spacer 56, the spacer 56 pushes the front side member 12 toward the vehicle width direction inner side (the force Fi in FIG. 8D). Accordingly, as illustrated in FIG. 8E, folding of the front side member 12 toward the vehicle width direction inner side occurs at a portion positioned at the vehicle width direction outer side of the power unit P.

The front side member 12 pushes the power unit P toward the vehicle width direction inner side due to this folding. Lateral force (force due to inertia) input to the power unit P, this being (one) section where mass is concentrated in the car A, moves the car A itself toward a collision opposite side (away from the barrier Br in the vehicle width direction). The car A and the barrier Br are thus further promoted to slide past one another, and localized deformation of a collision side end section of the vehicle body B is prevented or effectively suppressed.

Operation of the Coupling Member

A portion on the front end side of the coupling member 46, namely the front portion 48F and the intermediate portion 48C of the pipe 48, and the pipe-joined portion 52C of the front side join portion 52, is angled such that a rear side is separated further from the front side member 12 than a front side in plan view. When the barrier Br (another car or the like) collides with this angled portion, the angled portion converts a portion of the collision load into the load Fy toward the collision opposite side. The coupling member 46 accordingly promotes displacement in the vehicle width direction with respect to the barrier Br, namely promotes sliding past the barrier Br described above.

The portion on the front end side of the coupling member 46 is angled as described above, such that the coupling route between the front side member 12 and the end plate 44 is shorter than in an L-shaped coupling member with a portion jutting out along the vehicle width direction and an extension portion extending from the jutting out portion toward the rear in plan view. Under rearward deformation or displacement accompanying a small overlap collision, the coupling member 46 accordingly acts to pull the front end of the front side member 12 toward the vehicle width direction outer side with less play (free movement distance) than the coupling member of the above comparative example. The coupling member 46 accordingly works together with the spacer 56 to greatly promote folding of the front side member 12.

The front flange 30 that is joined to the front side join portion 52 of the coupling member 46 includes the side walls 30S. The side walls 30S function to push the front end of the front side member 12 in the vehicle width direction when the front end of the front side member 12 is pulled toward the vehicle width direction outer side due to the barrier Br pushing the coupling member 46 toward the rear. Accordingly, when the front end of the front side member 12 is being pulled toward the vehicle width direction outer side, there is no reliance on shear of the bolts 42 alone, as there would be in a comparative example not including the side walls 30S. Accordingly, in the vehicle front section structure 10, force to pull the front end of the front side member 12 toward the vehicle width direction outer side can efficiently be caused to act in a small overlap collision.

Moreover, the weld nuts 38 and the bolts 42 that fasten the flange 52F of the coupling member together with the front flange 30 of the front side member 12 and the like include those positioned further to the vehicle width direction inner side than a center line dividing the front side member 12 into left and right. Accordingly, in a small overlap collision, the (entire cross-section of the) entire front end of the front side member 12 is pulled toward the vehicle width direction outer side, in contrast to in a configuration in which the flange 52F is only fastened together with the front flange 30 at the vehicle width direction outer side of the center line. Moreover, in the coupling member 46 described above, the flange 52F is fastened together with the front flange 30 on both sides in the vehicle width direction. A concentration of load (stress) at a specific join location out of plural join portions that are fastened together can accordingly be better suppressed than in a configuration in which the flange 52F is only fastened together with the front flange 30 on one side of the center line.

In the vehicle front section structure 10, the front end of the front side member 12 is efficiently pulled toward the vehicle width direction outer side in a small overlap collision, contributing to folding of the front side member 12 at an appropriate location and an appropriate timing. Moreover, the front end 48FF of the pipe 48 configuring the coupling member 46 projects out further to the front than the front end of the front side member 12. Accordingly, the coupling member 46 is able to start pulling the front end of the front side member 12 toward the vehicle width direction outer side after the crash box 14 has been compressed, and before the front side member 12 is compressed by the collision load. The front side member 12 can accordingly be made to fold stably toward the vehicle width direction inner side (i.e., the folding direction of the front side member 12 is stabilized).

In the coupling member 46 configuring the vehicle front section structure 10, the front side join portion 52 that is joined to the pipe 48 has the two-member configuration of the main panel 54 and the reinforcement panel 55. This enables to increase arc welding portions with the pipe 48 than in a comparative example employing a front flange configured by a single member. This thereby enables the weld between the pipe 48 and the front side join portion 52 to be prevented or thoroughly suppressed from coming apart in a small overlap collision, and enables the coupling member 46 to efficiently pull the front end of the front side member 12 toward the vehicle width direction outer side.

Moreover, with the coupling member 46 in a comparative example in which through holes for joining the coupling member are formed in the front side member, if collision design is performed for a coupling member-attached state, there would be a concern that the through holes would be detrimental to collision performance in configurations in which a coupling member is not actually provided. Namely, there would be a concern of variation in frontal collision performance between cases in which a coupling member is joined to the through holes, and cases in which a coupling member is not joined to the through holes. In the comparative example, in which the front side member is formed with through holes for the above purpose, it is accordingly difficult to develop common structures for vehicles not provided with a coupling member.

However, in the coupling member 46, the flange 52F of the front side join portion 52 is joined to the front end of the front side member 12 in a state interposed between the front flange 30 of the front side member 12 and the rear flange 40 of the crash box 14. This thereby enables the coupling member 46 to be provided to counter small overlap collisions, while preventing or suppressing any detriment to energy absorption characteristics during a collision (collision performance in frontal collisions) due to the front side member 12 and the like in the vehicle front section structure 10.

Accordingly, the vehicle front section structure 10 enables deformation of the vehicle body in a small overlap collision to be suppressed using the coupling member 46 that couples together the front side member 12 and the end plate 44, while preventing or suppressing any detriment to collision performance due to the front side member 12.

The vehicle front section structure 10 enables the front side member 12 and the crash box 14 to be made common to vehicles in which the coupling member 46 is not provided (such as vehicles that have a different structure for countering small overlap collisions), while suppressing any detriment to collision performance in frontal collisions. Namely, a vehicle body structure can be made common between a configuration in which the coupling member 46 is provided to suppress deformation of the vehicle body in a small overlap collision and a vehicle not provided with the coupling member 46.

In particular, the rear flange 50 at the rear end side of the coupling member 46 is fastened to the apron upper member 26 using the bolts 58 and the weld nuts 59, and the front side join portion 52 on the front end side is fastened together with the flanges 30, 40 using the bolts 42 and the weld nuts 38. This thereby facilitates achieving a structure common to vehicles not provided with the coupling member 46, or provided with structures other than the coupling member 46, compared to a comparative example in which, for example, one or both of the front and rear ends of a coupling member are joined to the vehicle body B by welding or the like.

The coupling member 46 is joined to the end plate 44 by fastening along the front-rear direction using the bolts 58 and the weld nuts 59. In a comparative example in which, for example, a coupling member is fastened using bolts or the like that penetrate in the vehicle width direction through a wall portion of the apron upper member 26 with its length in the front-rear direction, collision load is borne by the shear of the bolts. In contrast, since the fastening direction to the end plate 44 is the front-rear direction as described above, the collision load can be borne as axial force by the coupling member 46 (the rear portion 48R of the pipe 48). The coupling member 46 can accordingly efficiently receive load from the barrier Br, without relying on the shear strength of the bolts 58.

Operation of Spacer

Moreover, the spacer 56 is provided between the front side member 12 and the coupling member 46, and overlaps with the front side member 12 and the coupling member 46 in the up-down direction. Accordingly, when the coupling member 46 that has been deformed or displaced toward the rear due to collision load in a small overlap collision impinges on the spacer 56, the spacer 56 pushes the front side member 12 toward the vehicle width direction inner side as described above. This operation, together with the operation of the coupling member 46 to pull the front end of the front side member 12 toward the vehicle width direction outer side described above, promotes folding of the front side member 12 at the side of the power unit as described above, and promotes vehicle width direction displacement between the car A and the barrier Br.

In particular, the spacer 56 is provided at the side face 12S2 of the front side member 12 that is facing the vehicle width direction outer side. Accordingly, a specific location of the front side member 12 (the location where the spacer 56 is installed) is pushed toward the vehicle width direction inner side by the spacer 56 in a small overlap collision. This thereby enables the front side member 12 to be folded at an appropriate location in a small overlap collision.

The front portion 48F of the pipe 48 of the coupling member 46 extends substantially horizontally from the front side join portion 52 toward the rear as viewed from the side. The front portion 48H is accordingly suppressed from being displaced or deformed in the up-down direction by rearward load from the barrier Br, and is displaced or deformed along a substantially horizontal plane. Load from the front portion 48F is transmitted by the spacer 56 as force to push the front side member 12 toward the vehicle width direction inner side. A force component in the up-down direction can accordingly be suppressed from occurring when transmitting this load, thereby improving load transmission efficiency from the coupling member 46, through the spacer 56, and into the front side member 12, compared to a configuration in which load is transmitted to the spacer from a coupling member that is inclined as viewed from the side. Folding of the front side member 12 is accordingly promoted, and moreover, load can be efficiently transmitted to the power unit P after the front side member 12 has folded, thus promoting vehicle width direction movement of the car A away from the barrier Br.

The pipe-joined portion 52C of the front side join portion 52 of the coupling member 46 juts out in the up-down direction with respect to the front portion 48F, and faces the spacer 56. Load from the barrier Br is also transmitted through the spacer 56 to the front side member 12 through the pipe-joined portion 52C. This thereby enables collision load to be efficiently transmitted to the front side member 12 through the pipe-joined portion 52C and the spacer 56 over a wider up-down range than in a configuration in which the join portion does not jut out to the top and bottom of the front portion 48F of the pipe 48.

In the first exemplary embodiment, explanation has been given regarding an example in which the pipe 48 configures the main body of the coupling member 46; however, the present invention is not limited thereto. For example, in place of the pipe 46, a coupling member with a main body configured with a closed cross-section structure by joining together plural members, or a coupling member with a main body configured by (bending) an extrusion molded component, may be employed.

In the first exemplary embodiment, explanation has been given regarding an example in which the rear end of the coupling member 46 is joined to the end plate 44; however the present invention is not limited thereto. For example, a coupling member may be employed with a rear end joined to the apron upper member 26 or the fender apron 22.

In the first exemplary embodiment, explanation has been given regarding an example in which the front side join portion 52 includes the main panel 54 and the reinforcement panel 55; however, the present invention is not limited thereto. For example, a front side join portion may be employed with a structure in which the pipe 48 (main body) is enclosed by bending a single panel (a structure in which a single panel configures a pair of plate portions). Moreover, for example, a front side join portion may be employed that is only joined to the pipe 48 (main body) from one side. As another example, a front side join portion configured from three or more panels may be employed. Namely, it is sufficient that the front side join portion is joined to the pipe 48 (main body) with the necessary strength for the load received in a small overlap collision.

Moreover, in the first exemplary embodiment, explanation has been given regarding an example in which the pipe 48 of the coupling member 46 includes the front portion 48F serving as a horizontal portion; however, the present invention is not limited thereto. For example, configuration may be made with a coupling member in which a front portion, namely a portion overlapping with the spacer 56 in the up-down direction, includes a pipe that is angled or curved with respect to the length direction of the front side member 12 as viewed from the side.

Moreover, in the first exemplary embodiment, explanation has been given regarding an example in which the spacer 56 is provided to the side face 12S2 of the front side member 12; however, the present invention is not limited thereto. For example, the spacer 56 may be attached to or integrally provided at the coupling member side, or the spacer may be supported by another portion configuring the vehicle body B. Moreover, in configurations in which the spacer 56 is provided to the front side member 12, the joining structure of the spacer 56 to the front side member 12 is not limited to fastening, and, for example, a welding, a fitting structure, or the like may be employed. Moreover, configuration may be made in which the spacer 56 is omitted.

Second Exemplary Embodiment

Figure 9:
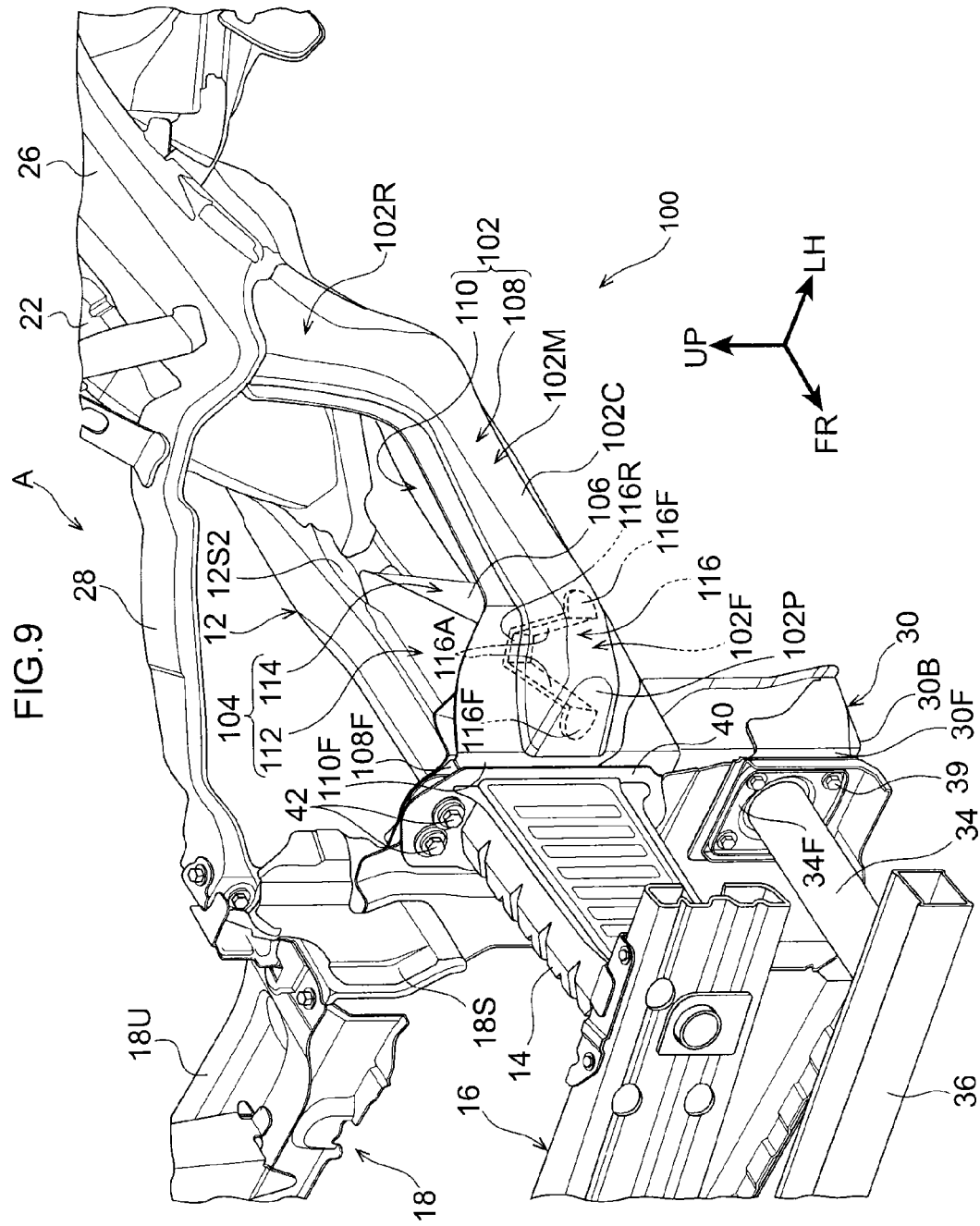
FIG. 9 is an enlarged perspective view illustrating relevant portions of a vehicle front section structure according to a second exemplary embodiment of the present invention.
Figure 10:
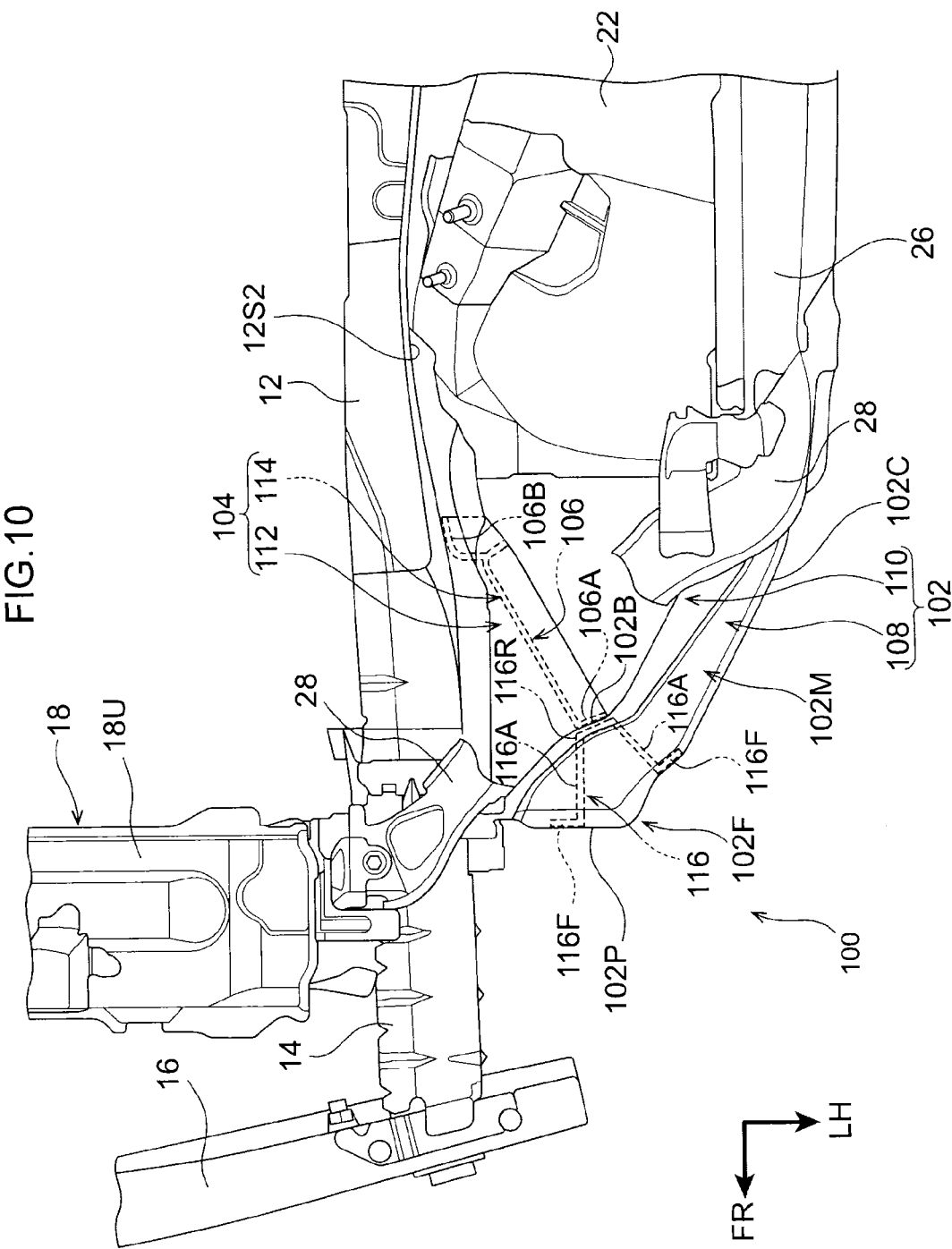
FIG. 10 is an enlarged plan view illustrating relevant portions of the vehicle front section structure according to the second exemplary embodiment of the present invention.

FIG. 9 is a perspective view illustrating configuration of relevant portions of a vehicle front section structure 100 according to a second exemplary embodiment of the present invention. FIG. 10 is a plan view illustrating the vehicle front section structure 100, and FIG. 11 is a side view illustrating the vehicle front section structure 100.

Figure 11:
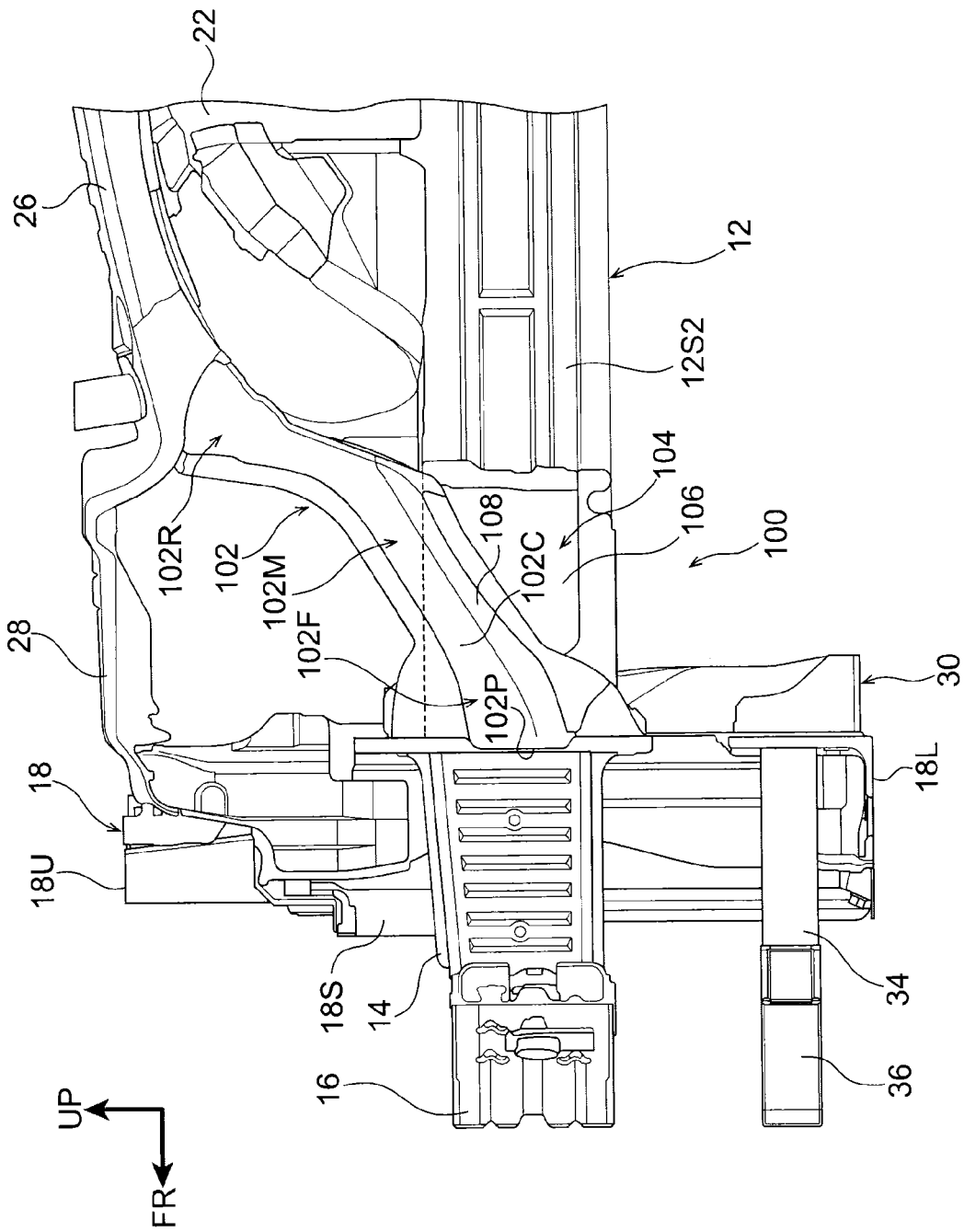
FIG. 11 is an enlarged side view illustrating relevant portions of the vehicle front section structure according to the second exemplary embodiment of the present invention.

As illustrated in FIG. 9 to FIG. 11, the vehicle front section structure 100 includes a coupling member 102 with a rectangular closed cross-section in place of the coupling member 46 including the pipe 48 with a circular closed cross-section. The vehicle front section structure 100 moreover includes a spacer (projection member) 104 joined to the coupling member 102 in place of the spacer 56 disposed at a separation to the coupling member 46. Specific explanation thereof follows.

Coupling Member

The coupling member 102 extends out integrally from a front end portion of the apron upper member 26, and a front end portion of the coupling member 102 is fixed to a front portion of the front side member 12. Specifically, the coupling member 102 is formed with a rear portion 102R, an intermediate portion 102M, and a front portion 102F connected in sequence from the rear.

The rear portion 102R of the coupling member 102 extends downward and toward the front from the front end portion of the apron upper member 26. The rear portion 102R of the present exemplary embodiment is inclined at an angle closer to the vertical than to the horizontal, as illustrated in FIG. 11. The intermediate portion 102M extends downward and toward the front from a front end portion of the rear portion 102R. The intermediate portion 102M has an angle of inclination closer to the horizontal than the rear portion 102R as viewed from the side, and is set at an angle of inclination of approximately 45° in the present exemplary embodiment. As illustrated in FIG. 10, the intermediate portion 102M is angled such that in plan view, a front side is closer to the front side member 12 than a rear side in the vehicle width direction.

The front portion 102F of the coupling member 102 is disposed at the same height as the front side member 12 (overlapping in the up-down direction), and is positioned at the vehicle width direction outer side of a front portion of the front side member 12. A front end side of the front portion 102F extends toward the vehicle width direction inner side, and reaches between the front side member 12 and the crash box 14. A vehicle width direction outer face of the coupling member 102 (in particular of the front portion 102F and the intermediate portion 102M) configures a curved face 102C that curves such that its rear side faces more toward the vehicle width direction outer side than its front side.

Supplementary explanation is given regarding the overall structure of the coupling member 102, before proceeding to explanation regarding a joining structure between the front portion 102F and the front side member 12 and the crash box 14. In the coupling member 102, an outer panel 108 with a hat shaped cross-section opening toward the vehicle width direction inner side, and an inner panel 110 with a hat shaped cross-section opening toward the vehicle width direction outer side (see FIG. 10) are joined together at respective upper and lower flanges. The coupling member 102 is thus formed with a closed cross-section structure with a rectangular cross-section, as described above. At the front portion 102F side of the coupling member 102, the outer panel 108 is configured with a hat shaped cross-section opening in a substantially rear direction, and the inner panel 110 has a flat plate shape joined to the upper and lower flanges of the outer panel 108.

Figure 12:
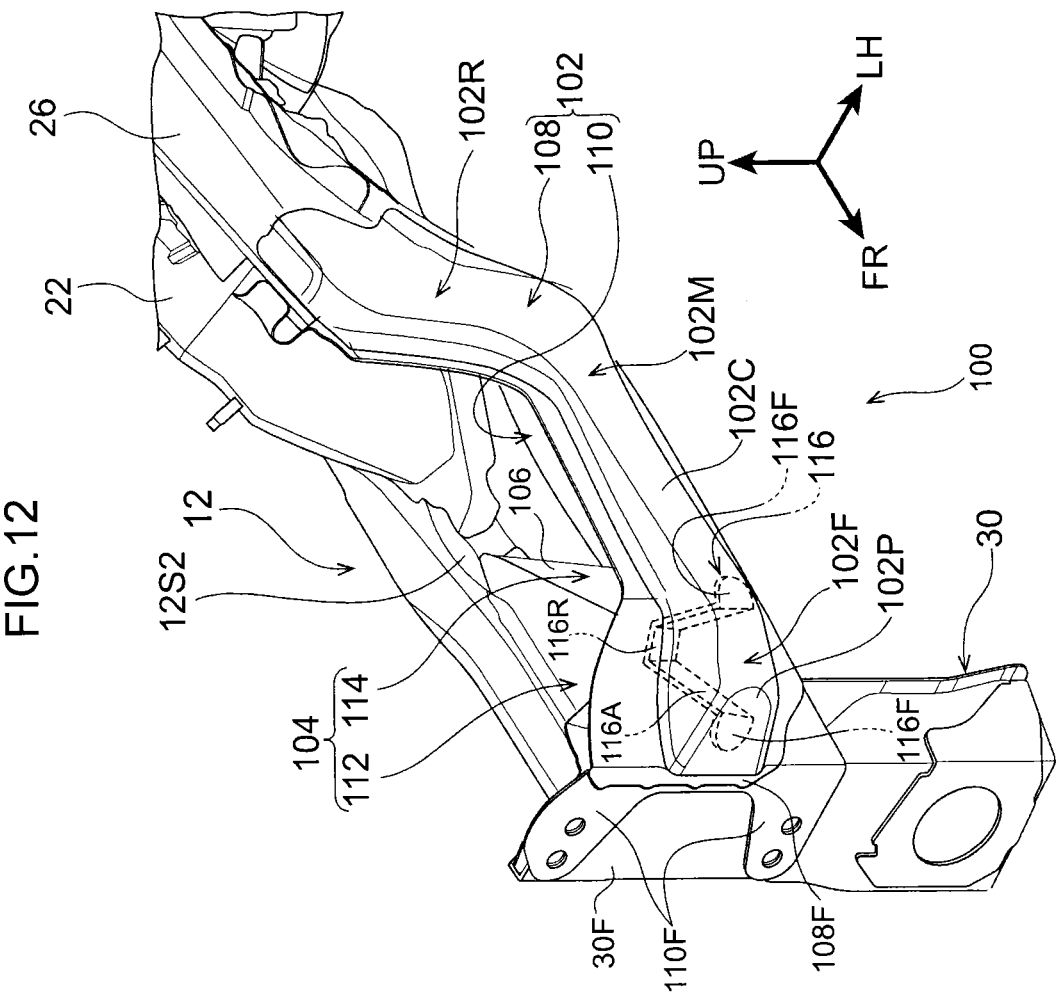
FIG. 12 is a perspective view illustrating relevant portions of the vehicle front section structure according to the second exemplary embodiment of the present invention, from which bumper reinforcement, a crash box, and the like have been removed.

As illustrated in FIG. 12, a flat plate shaped flange 110F extends out toward the vehicle width direction inner side from a vehicle width direction inner end portion of the front portion 102F of the inner panel 110. A flange 108F extending out from a vehicle width direction inner end portion of the outer panel 108 is joined to a portion at the vehicle width direction outer end side of the flange 11 OF from the front.

The plate thickness direction of the flange 110F runs in the front-rear direction, and an up-down direction intermediate portion of the flange 11 OF is cut away from the vehicle width direction inner side. The flange 110F is interposed between the flange body 30F of the front flange 30 provided at the front side member 12 and the flange body 40F of the rear flange 40 provided at the crash box 14. Moreover, the flange 110F is joined between the flange body 30F and the flange body 40F by fastening together at four fastening locations by screwing together the weld nuts 38 and the bolts 42. The flange 110F of the coupling member 102 corresponds to a joining plate.

A front end of the coupling member 102 described above is positioned further to the front than the front end of the front side member 12. Specifically, as illustrated in FIG. 9 and FIG. 12, the outer panel 108 includes a projection portion 102P projecting out to the front of the flange 108F. A front end of the projection portion 102P is positioned further to the front than the front end of the front side member 12.

Spacer

The vehicle front section structure 100 includes the spacer 104 that is joined to the front side member 12 and the coupling member 102 respectively. The spacer 104 is, for example, formed in a vertically flattened hollow triangular column shape by joining together plural members formed from sheet metal material. The spacer 104 projects out from the front portion of the front side member 12 toward the vehicle width direction outer side. The spacer 104 is, for example, joined to the side face 12S2, this being a vehicle width direction outer wall portion of the front side member 12, by means such as welding.

The spacer 104 includes a load transmission portion 106 angled such that its rear side is further toward the vehicle width direction inner side than its front side. The load transmission portion 106 configures a vehicle width direction outer (rear side) wall of the spacer 104. Specifically, the spacer 104 is configured from main portions of an inner panel 112 that is joined to the front side member 12, and an outer panel 114 that is joined to the inner panel 112 and forms a closed cross-section with the inner panel 112. As illustrated in FIG. 10, in plan view the outer panel 114 extends from a high rigidity portion (a location installed with a bulkhead 116), described later, of the coupling member 102, and reaches as far as the location of a join between a rear portion of the spacer 104 and the side face 12S2 of the front side member 12.

The outer panel 114 is configured as a portion of the spacer 104 with high rigidity with respect to rearward load by, for example, configuring the outer panel 114 from a material with greater thickness, or with higher tensile strength, than the inner panel 112. Accordingly, in the present exemplary embodiment, the load transmission portion 106 is configured mainly at the outer panel 114.

A front side join portion 106A is provided at a front end portion of the load transmission portion 106. The front side join portion 106A is bent so as to follow a back face 102B of the front portion 102F of the coupling member 102 (a rear wall portion 116R of the bulkhead 116, described later), and is joined to the back face 102B by means such as welding or bolt fastening. A rear side join portion 106B is provided at a rear end portion of the load transmission portion 106. The rear side join portion 106B is bent so as to follow the side face 12S2 of the front side member 12, and is joined to the side face 12S2 by means such as welding or bolt fastening.

Bulkhead

As illustrated in FIG. 9 and FIG. 10, the bulkhead 116, serving as a reinforcement member, is provided inside the cross-section of the front portion 102F of the coupling member 102. The bulkhead 116 is formed in a hat shape, opening toward the front in plan view. Specifically, the bulkhead 116 includes the rear wall portion 116R forming the bottom of the hat shape, a pair of arms 116A extending from both vehicle width direction ends of the rear wall portion 116R toward the front, and a pair of left and right front flanges 116F extending from front ends of both arms so as to head away from each other in the vehicle width direction. The rear wall portion 116R is joined to an inner face (front face) of a portion of the inner panel 110 forming the back face 102B of the coupling member 102 by means such as welding.

The pair of front flanges 116F are joined to an inner face (rear face) of a portion of the outer panel 108 forming the front portion 102F by means such as welding. More specifically, the front flange 116F on the vehicle width direction inner side is joined to the inner face at a portion of the outer panel 108 configuring the projection portion 102P. The front flange 116F on the vehicle width direction outer side is joined to the inner face at a portion of the outer panel 108 configuring a front portion of the curved face 102C.

The vehicle front section structure 100 is thus formed with a path along which rearward load input to a front end portion of the coupling member 102 passes through the bulkhead 116 and the load transmission portion 106 of the spacer 104, and is transmitted into the front side member 12. The bulkhead 116 configures a reinforcement structure at a portion where the front portion 102F of the coupling member 102 transmits load to the spacer 104. The bulkhead 116 forms the high rigidity portion at the front portion 102F of the coupling member 102.

The bulkhead 116 may be understood as a portion of the spacer 104 (a front side extension portion of the load transmission portion 106) that transmits load input to the projection portion 102P to the front side member 12, and is independent of the coupling member 102 that transmits load to the apron upper member 26. The front portion 102F of the coupling member 102, the bulkhead 116, and the spacer 104 may also be collectively understood as a member (gusset) for transmitting rearward load input at the vehicle width direction outer side of the front side member 12 to the front side member 12.

Other configurations of the vehicle front section structure 100 according to the present exemplary embodiment, including portions that are not illustrated, have basically the same configuration as in the vehicle front section structure 10 according to the first exemplary embodiment. Accordingly, the vehicle front section structure 100 enables basically the same advantageous effects to be obtained from the same operation as in the vehicle front section structure 10.

In the vehicle front section structure 100, the load transmission portion 106 of the spacer 104 is joined to the back face 102B of the coupling member 102. Load can accordingly be transmitted from the barrier Br to a side portion of the front side member 12 through the coupling member 102 (bulkhead 116) and the spacer 104 from before the coupling member 102 starts to deform. In particular, since the spacer 104 includes the load transmission portion 106 as described above, when collision load is input to the projection portion 102P of the coupling member 102 from the front, the load can be efficiently transmitted through the load transmission portion 106 to the front side member 12. A fold toward the vehicle width direction inner side can be induced in the front side member 12 since stress can be concentrated in the front side member 12 in the vicinity of a rear end of the load transmission portion 106 (at the side of the power unit P).

Moreover, the projection portion 102P of the coupling member 102 is positioned further toward the front than the front end of the front side member 12, and so collision load accordingly acts on the coupling member 102 before acting on the front side member 12 after the crash box 14 has been compressed. Since the projection portion 102P of the coupling member 102, this being a load input portion, is positioned further to the vehicle width direction outer side than the front side member 12, the collision load causes moment acting in a direction to fold the front side member toward the vehicle width direction inner side. Folding of the front side member 12 toward the vehicle width direction inner side is accordingly promoted.

In the vehicle front section structure 100, a stable displacement of the car A with respect to the barrier Br in the vehicle width direction can accordingly be achieved in a short time following the start of a small overlap collision, and this displacement can be further promoted.

The coupling member 102 and the load transmission portion 106 can be prevented from unintentionally moving apart from each other due to collision load since the front end portion of the load transmission portion 106 of the spacer 104 is joined to the back face 102B of the coupling member 102 (the rear wall portion 116R of the bulkhead 116). In a comparative example in which the spacer 104 and the coupling member 102 are not joined together, there is concern of noise being caused by unintended interference between the coupling member and the load transmission portion 106 due to vibration of the vehicle during normal travel. However, in the present exemplary embodiment, the front end portion of the load transmission portion 106 of the spacer 104 is joined to the back face 102B of the coupling member 102 (the rear wall portion 116R of the bulkhead 116) as described above. There is accordingly no unintended interference between the coupling member and the load transmission portion 106 due to vibration of the vehicle during normal travel, enabling the occurrence of noise caused by such interference to be prevented.

In the second exemplary embodiment, the spacer 104 is formed in a triangular shape in plan view; however, the present invention is not limited thereto, and the shape of the projection member may be set and modified as appropriate. For example, the projection member may be formed in a trapezoid or semicircle protruding toward the vehicle width direction outer side in plan view.

In the second exemplary embodiment, the crash box 14, serving as a shock absorbing section, is fixed to the portion of the front side member 12; however, the present invention is not limited thereto, and a shock absorbing section may be provided integrally to a front portion of the front side member. In such cases, a front end portion of the coupling member is fixed to a portion of the front side member further to the rear side than the shock absorbing section.

In the second exemplary embodiment, the bulkhead 116 is attached inside the cross-section of the front portion 102F of the hollow shaped 102 as a reinforcement member, thereby reinforcing the front portion 102F; however, the present invention is not limited thereto, and configuration may be made without a reinforcement member. In such cases, for example, a front portion of the coupling member may be formed thicker (the plate thickness of the material may be set thicker) than at other locations of the coupling member (at least a location adjacent to the front portion of the coupling member), thereby reinforcing the front portion of the coupling member. Moreover, since the front portion of the coupling member is preferably configured with higher rigidity at least with respect to load in the front-rear direction, configuration may be made in which one or plural beads extending in the front-rear direction, for example, are formed to the front portion of the coupling member.

In the second exemplary embodiment, the vehicle width direction outer face of the front portion 102F of the coupling member 102 configures the curved face 102C that curves such that the rear side is positioned further to the vehicle width direction outer side than the front side. However, the present invention is not limited thereto, and configuration may be made in which the vehicle width direction outer face of the front portion of the coupling member runs along the front-rear direction, or is angled so as to face more toward the vehicle width direction outer side at the rear side than the front side.

In each of the exemplary embodiments described above, explanation has been given regarding an example in which the vehicle front section structure 10 includes the coupling member 46, 102, and the spacer 56, 104 on both sides in the vehicle width direction; however, the present invention is not limited thereto. For example, configuration may be made in which the coupling member 46, 102, and the spacer 56, 104 are provided at only one side in the vehicle width direction. In such cases, at the side at which the coupling member 46, 102, and the spacer 56, 104 are not provided, a vehicle-mounted component may, for example, double as a spacer, or another structure may be employed to counter small overlap collisions.

In each of the exemplary embodiments described above, explanation has been given regarding an example in which the front flange 30 extends downward and supports the rear end of the pipe member 34 and the front end of the lower member 32. However, the present invention is not limited thereto. In the present invention, explanation has been given regarding an example in which the front flange 30 includes a pair of side walls including the side wall 30S at the vehicle width direction inner side; however, the present invention is not limited thereto. Configuration may be made in which the front flange 30 or an equivalent front flange is not provided with one or both of the pair of side walls.

Obviously, various modifications may be implemented within a range not departing from the spirit of the present invention.

The invention claimed is:

1. A vehicle front section structure comprising:
   a front side member that is formed with a front flange at a vehicle front-rear direction front side;
   a crash box that is joined to the front flange at a rear flange formed at a vehicle front-rear direction rear side; and
   a coupling member that is formed with a closed cross-section structure by an inner panel and an outer panel, that is joined to a fender apron section at a vehicle front-rear direction rear side, the coupling member including a joining plate extending from a vehicle front-rear direction front side end portion of the inner panel and curving in a direction inwardly toward a vehicle width direction inner side, and the joining plate being joined to the front flange in an interposed state between the front flange and the rear flange,
   wherein a vehicle front-rear direction front side of a portion of the coupling member is positioned at a vehicle width direction outer side of the front side member angled such that, in plan view, a vehicle front-rear direction rear side is separated further to the vehicle width direction outer side of the front side member than the vehicle front-rear direction front side.

2. The vehicle front section structure of claim 1, wherein:
the coupling member includes a main body that has a closed cross-section structure in a cross-section orthogonal to a length direction of the main body, and to which the joining plate is joined at a vehicle front-rear direction front side; and
the joining plate includes two plate members respectively joined to the main body by arc welding in a state sandwiching the main body in cross-section view.

3. The vehicle front section structure of claim 1, wherein the joining plate of the coupling member is fastened together with the front flange and the rear flange by a fastener, and the vehicle front-rear direction rear side of the coupling member is fastened to the fender apron section by a fastener.

4. The vehicle front section structure of claim 1, wherein the front flange includes a side wall portion that faces a vehicle width direction inner face of the front side member.

5. The vehicle front section structure of claim 1, wherein the joining plate is joined to the front flange at least at a portion at the vehicle width direction inner side of a vehicle width direction center of the front side member.

6. The vehicle front section structure of claim 1, wherein the joining plate is joined to the front flange at a portion at the vehicle width direction inner side of a vehicle width direction center of the front side member and at a portion at the vehicle width direction outer side of the vehicle width direction center of the front side member.

* * * * *